(12) United States Patent
Wagner et al.

(10) Patent No.: US 7,653,166 B2
(45) Date of Patent: Jan. 26, 2010

(54) SYNCHRONIZATION DEVICE AND DEVICE FOR GENERATING A SYNCHRONIZATION SIGNAL

(75) Inventors: Carmen Wagner, Langensendelbach (DE); Stefan Koehler, Roedental (DE); Holger Stadali, Erlangen (DE); Guenter Hofmann, Litzendorf (DE); Marco Breiling, Erlangen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 610 days.

(21) Appl. No.: 11/301,483

(22) Filed: Dec. 12, 2005

(65) Prior Publication Data

US 2006/0165200 A1  Jul. 27, 2006

(30) Foreign Application Priority Data

Dec. 13, 2004  (DE) .................. 10 2004 059 957

(51) Int. Cl.
  *H04L 7/00*  (2006.01)
(52) U.S. Cl. ....................................... 375/354
(58) Field of Classification Search ............. 375/354, 375/130, 146, 147, 136, 355, 362, 364, 316; 370/509, 210, 516
  See application file for complete search history.

(56) References Cited

U.S. PATENT DOCUMENTS

| | | | |
|---|---|---|---|
| 4,803,703 A | 2/1989 | DeLuca et al. | |
| 5,343,497 A | 8/1994 | Canosi et al. | |
| 5,373,536 A | 12/1994 | Dehner, Jr. et al. | |
| 5,960,047 A | 9/1999 | Proctor, Jr. et al. | |
| 6,009,334 A | 12/1999 | Grubeck et al. | |
| 6,424,683 B1 | 7/2002 | Schollhorn | |
| 6,882,633 B2 | 4/2005 | Dotsch et al. | |
| 7,133,479 B2* | 11/2006 | Lee | 375/354 |
| 2002/0114354 A1 | 8/2002 | Sinha et al. | |
| 2002/0126618 A1* | 9/2002 | Kim | 370/208 |
| 2002/0181509 A1* | 12/2002 | Mody et al. | 370/480 |
| 2003/0053558 A1 | 3/2003 | Unger et al. | |
| 2003/0128161 A1 | 7/2003 | Oh et al. | |
| 2003/0215035 A1 | 11/2003 | Amerga et al. | |
| 2003/0227895 A1 | 12/2003 | Strutt et al. | |

(Continued)

FOREIGN PATENT DOCUMENTS

DE  19802373 C1  1/1998

(Continued)

OTHER PUBLICATIONS

Li, Xinrong, et al.; Super-Resolution TOA Estimation With Diversity for Indoor Geolocation; Jan. 1, 2004; IEEE.

(Continued)

Primary Examiner—Khai Tran
(74) Attorney, Agent, or Firm—Michael A. Glenn; Glenn Patent Group

(57) ABSTRACT

A synchronization device for determining a position of a synchronization signal in a receive signal, the synchronization signal being based on a coarse synchronization signal and a fine synchronization signal, includes a signal processing means configured to determine, based on the coarse synchronization signal, a section of the receive signal in which is located the fine synchronization signal, and to determine in the section of the receive signal, based on the fine synchronization signal, the position of the synchronization signal in the receive signal for a synchronization.

46 Claims, 15 Drawing Sheets

U.S. PATENT DOCUMENTS

| | | |
|---|---|---|
| 2004/0072579 A1 | 4/2004 | Hottinen |
| 2004/0203871 A1 | 10/2004 | Geier et al. |
| 2006/0098713 A1* | 5/2006 | Tian ............................ 375/130 |

FOREIGN PATENT DOCUMENTS

| | | |
|---|---|---|
| DE | 199 17 337 A1 | 10/2000 |
| EP | 0 632 577 | 1/1995 |
| EP | 0 820 156 A2 | 1/1998 |
| EP | 0 930 704 A2 | 11/1998 |
| EP | 0 933 882 | 8/1999 |
| EP | 1 032 157 A1 | 8/2000 |
| EP | 1 089 452 | 4/2001 |
| EP | 1 206 068 | 5/2002 |
| EP | 1206068 A2 | 5/2002 |
| EP | 1 322 061 | 6/2003 |
| WO | WO 87/01490 | 3/1987 |
| WO | WO 03/001699 | 1/2003 |
| WO | WO 2005/098465 A2 | 10/2005 |

OTHER PUBLICATIONS

Harris, F. Multirate Signal Processing for Communication Systems. May 14, 2004. Prentice Hall. p. 400-407.

Fliege, N. Multiraten-signalverarbeitung. 1993. Germany. p. 256-258.

* cited by examiner recsigdel = (a_algoshift + a_pipdel + a_predist + t_noprecorrvals +
t0_frontpaddlength − t0_startpadlen)
− (at_dist_Brnd − a_initdel).

FIGURE 5

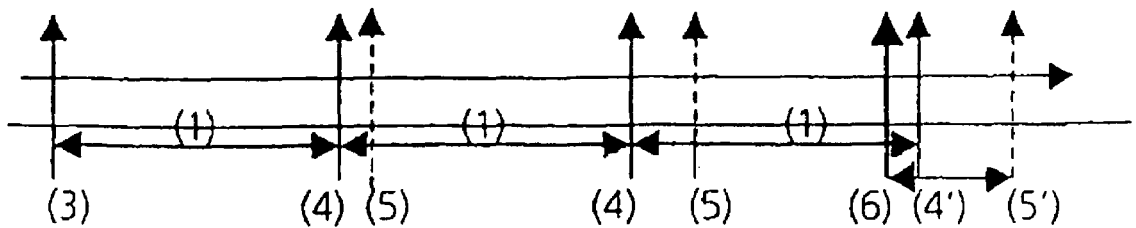

FIGURE 7

$$a\_algoshift = \frac{B\_clock}{B\_clock\_4} \quad ...$$
$$+ windowlength\_total * \frac{B\_clock}{B\_clock\_4} \quad ...$$
$$+ a\_burstlen * \frac{B\_clock}{B\_clock\_48} \quad ...$$
$$+ floor(\frac{no\_downsplcoeff}{2} + \frac{no\_downsplcoeff}{2} * \frac{B\_clock}{B\_clock\_4} + ...$$
$$\frac{no\_impcoeff}{2} * \frac{B\_clock}{B\_clock\_16} + \frac{no\_resplcoeff}{2} * \frac{B\_clock}{B\_clock\_4})$$

WHEREIN:

no_downsplcoeff=47 (NUMBER OF FILTER COEFFICIENTS FOR THE DOWNSAMPLING)

no_impcoeff=19 (NUMBER OF FILTER COEFFICIENTS OF THE MATCHED FILTER)

no_resplcoeff=47 (NUMBER OF FILTER COEFFICIENTS FOR RESAMPLING THE CORRELATION SIGNAL)

FIGURE 8

| ELEMENT OF THE SEQUENCE | COMPLEX SYMBOL |
|---|---|
| 0 | 1+j |
| 1 | -1+j |
| 2 | -1-j |
| 3 | 1-j |

| FREQUENCY BAND NUMBER | FREQUENCY, AS A FUNCTION | FREQUENCY, APPROX VALUE |
|---|---|---|
| 1 | -5*B_clock_16 | -10,00 MHz |
| 2 | -B_clock_16 | -2,00 MHz |
| 3 | 3*B_clock_16 | 6,00 MHz |
| 4 | -4*B_clock_16 | -8,00 MHz |
| 5 | 0 | 0 |
| 6 | 4*B_clock_16 | 8,00 MHz |
| 7 | -3*B_clock_16 | -6,00 MHz |
| 8 | B_clock_16 | 2,00 MHz |
| 9 | 5*B_clock_16 | 10,00 MHz |

(1) 1 B_cycle_48
(2) 1 B_cycle
(3) TOTAL DELAY IN THE A-BURST GENERATION
(4) DELAY DUE TO PIPELINING ETC.
(5) CUMULATED FILTER GROUP RUNTIMES (= CUMULATED SETTLING TIMES)
(6) LENGTH a_burstlen (IN B_cycles_48) OF THE UNDERLYING AND THE RELEVANT A-BURST AS WILL BE CONSIDERED IN THE FOLLOWING
(7) CUMULATED DECAY TIMES OF THE FILTERS
(8) LENGTH OF THE GENERATED A-BURST IN B_SAMPLES (1) a_burstmaxlen  (5) at_dist
(2) a_burstlen     (6) t_burstperiod
(3) t_burstmaxlen  (7) ta_dist
(4) t_burstlen     (8) a_burstperiod
(9) a_initdel GENERATION OF A T BURST WITH KEYED-IN
CHANNEL BIT FROM halfburst1 and halfburst2

(1) halfburstlen
(2) shift 12
(3) AREA OF OVERLAP OF THE LENGTH halfburstlen - shift 12

SYNCHRONIZATION DEVICE AND DEVICE FOR GENERATING A SYNCHRONIZATION SIGNAL

BACKGROUND OF THE INVENTION

1. Field of the Invention

The present invention relates to synchronizing a receiver and a transmitter in digital transmission systems.

2. Description of Prior Art

In digital transmission systems, the information bits to be transmitted are combined into information blocks, each information block corresponding to a frame structure. Each information block includes, in addition to the information bits, a number of additional information bits necessary for effecting the data transmission.

Since the information sent out can be detected with a receiver, in addition to retrieving a sampling clock, it is also necessary to determine the point in time at which point a respective information block is received. In other words, a block synchronization must be conducted in the receiver so as to synchronize the receiver and the transmitter relative to each other.

In order to achieve synchronization, a transmitter sends out, for example, a synchronization signal known to the receiver. In the receiver, a receive signal, which includes the synchronization signal, is processed to detect a position of the synchronization signal in the receive signal, and/or to detect a time of occurrence of the synchronization signal. To this end, a cross-correlation may be conducted, for example, between the receive signal and a copy of the synchronization signal so as to find the synchronization signal in the receive signal. Since it is necessary, for accurately determining a position, to send out a broad-band synchronization signal, determining a position is associated with considerable computing complexity, since it is always required to process broad-band signals at a high sampling clock.

If, for example, a very broad-band digital signal (RF bandwidth B) is to be synchronized, i.e. if either fixed, known synchronization signals (preambles) are to be found in a continuous receive signal, or if fixed, known preambles are to be found within signal sections (signal bursts), the receive signal must be sampled and processed, on the grounds of the sampling theorem, at least with a bandwidth B so as to find the synchronization signals. If the transmitter or the receiver have just been switched on, there is as yet no information whatsoever about where the synchronization signal (preamble) might be, for example.

For this reason, the entire receive signal must be sampled and processed at the high bandwidth B over a relatively long period. If sampling is effected, for example, at a bandwidth of 77 MHz to 100 MHz, 100 million tests per second will have to be performed with regard to the preamble start, i.e. with regard to a start of the preamble in the receive signal, in order to find the preamble without prior information. If one cross-correlation, for example, is conducted in each test, each test involves a very large number of computing operations which require considerable system resources. A direct or blind (on-line) search, for example, for a preamble in a broad-band signal is impossible due to this high expenditure.

SUMMARY OF THE INVENTION

It is the object of the present invention to provide a synchronization concept reduced in expenditure.

In accordance with a first aspect, the invention provides a synchronization device for determining a position of a synchronization signal in a receive signal, the synchronization signal being based on a coarse synchronization signal and a fine synchronization signal, having:

a signal processor configured to determine, based on the coarse synchronization signal, a section of the receive signal in which is located the fine synchronization signal, and to determine in the section of the receive signal, based on the fine synchronization signal, the position of the synchronization signal in the receive signal for a synchronization, wherein the signal processor is configured to detect the fine synchronization signal in the section of the receive signal, and wherein the coarse synchronization signal has a bandwidth which is smaller than a bandwidth of the fine synchronization signal, the signal processor being configured to perform a detection of the coarse synchronization signal in the receive signal at a first sampling rate, and to perform a detection of the fine synchronization signal at a second sampling rate, the second sampling rate being higher than the first sampling rate.

In accordance with a second aspect, the invention provides a device for synchronizing a receiver and a transmitter, the transmitter being configured to send out a synchronization signal which is based on a coarse synchronization signal for a coarse synchronization, and on a fine synchronization signal for a fine synchronization, having:

a sampler for sampling a receive version of the synchronization signal to provide a receive signal;

a synchronization device for determining a position of a synchronization signal in a receive signal, the synchronization signal being based on a coarse synchronization signal and a fine synchronization signal, having:

a signal processor configured to determine, based on the coarse synchronization signal, a section of the receive signal in which is located the fine synchronization signal, and to determine in the section of the receive signal, based on the fine synchronization signal, the position of the synchronization signal in the receive signal for a synchronization, wherein the signal processor is configured to detect the fine synchronization signal in the section of the receive signal, and wherein the coarse synchronization signal has a bandwidth which is smaller than a bandwidth of the fine synchronization signal, the signal processor being configured to perform a detection of the coarse synchronization signal in the receive signal at a first sampling rate, and to perform a detection of the fine synchronization signal at a second sampling rate, the second sampling rate being higher than the first sampling rate, the synchronization device being configured to provide a position signal which indicates a position of the synchronization signal in the receive signal; and a controller for controlling a sampling time of the sampler in dependence on the position signal so as to synchronize the receiver and the transmitter.

In accordance with a third aspect, the invention provides a device for generating a synchronization signal which may be sent out to synchronize a receiver and a transmitter, having:

a coarse synchronization signal provider for providing a coarse synchronization signal having a first bandwidth, and a fine synchronization signal having a second bandwidth, the first bandwidth being smaller than the second bandwidth; and a synchronization signal provider for providing the synchronization signal using the coarse synchronization signal and the fine synchronization signal.

In accordance with a fourth aspect, the invention provides a synchronization method for determining a position of a synchronization signal in a receive signal, the synchronization signal being based on a coarse synchronization signal and a fine synchronization signal, the method including the steps of:

determining a section of a receive signal in which is located the fine synchronization signal, on the basis of the coarse synchronization signal;

determining the position of the synchronization signal in the receive signal for a synchronization on the basis of the fine synchronization signal in the section of the receive signal, wherein the step of determining the position of the synchronization signal in the receive signal includes the step of detecting the fine synchronization signal in the receive signal, wherein the coarse synchronization signal has a bandwidth which is smaller than a bandwidth of the fine synchronization signal, wherein a detection of the coarse synchronization signal in the receive signal is performed at a first sampling rate, wherein a detection of the fine synchronization signal is performed at a second sampling rate, and wherein the second sampling rate is higher than the first sampling rate.

In accordance with a fifth aspect, the invention provides a method for synchronizing a receiver and a transmitter, the transmitter being configured to send out a synchronization signal which is based on a coarse synchronization signal for a coarse synchronization, and on a fine synchronization signal for a fine synchronization, the method including the steps of:

sampling a receive version of the synchronization signal so as to provide a receive signal;

performing the synchronization method for determining a position of a synchronization signal in a receive signal, the synchronization signal being based on a coarse synchronization signal and a fine synchronization signal, the method including the steps of:

determining a section of a receive signal in which is located the fine synchronization signal, on the basis of the coarse synchronization signal;

determining the position of the synchronization signal in the receive signal for a synchronization on the basis of the fine synchronization signal in the section of the receive signal, wherein the step of determining the position of the synchronization signal in the receive signal includes the step of detecting the fine synchronization signal in the receive signal, wherein the coarse synchronization signal has a bandwidth which is smaller than a bandwidth of the fine synchronization signal, wherein a detection of the coarse synchronization signal in the receive signal is performed at a first sampling rate, wherein a detection of the fine synchronization signal is performed at a second sampling rate, and wherein the second sampling rate is higher than the first sampling rate, to obtain a position signal which indicates a position of the synchronization signal in the receive signal; and controlling a sampling time in dependence on the position signal so as to synchronize the receiver and the transmitter.

In accordance with a sixth aspect, the invention provides a method for generating a synchronization signal which may be sent out to synchronize a receiver and a transmitter, the method including the steps of:

providing a coarse synchronization signal having a first bandwidth, and a fine synchronization signal having a second bandwidth, the first bandwidth being smaller than the second bandwidth; and providing the synchronization signal using the coarse synchronization signal and the fine synchronization signal.

The present invention is based on the findings that synchronization of a receiver and a transmitter may be performed at reduced expenditure in an efficient manner if the synchronization is performed in two stages. In accordance with the invention, a coarse synchronization is initially performed on the basis of a coarse synchronization signal which is narrow-band, the coarse synchronization signal being part of a synchronization signal. In accordance with the invention, a section of a receive signal, which includes the synchronization signal, is initially detected in this manner. Since the coarse synchronization signal is narrow-band, coarse synchronization may be conducted in a cost-efficient manner at a low processing rate. At a second stage, a broad-band fine synchronization signal, which is also included in the synchronization signal, is searched for in the detected section of the receive signal so as to precisely determine a position of the fine synchronization signal in the section of the receive signal in order to precisely locate the synchronization signal in the receive signal. Since the fine synchronization signal is more broad-band than the coarse synchronization signal, the fine synchronization, i.e. the precise determination of the position of the synchronization signal in the receive signal, is performed at a higher processing rate than with the coarse synchronization signal.

The inventive synchronization concept is based on the fact that a synchronization signal which may be sent out by a transmitter, is based on the coarse synchronization signal and on the fine synchronization signal. Preferably, the synchronization signal includes the coarse synchronization signal and the fine synchronization signal, it being possible for the fine synchronization signal to be sent out, preferably, temporally after the coarse synchronization signal, and the fine synchronization signal having a larger bandwidth than the coarse synchronization signal.

To determine the position of the synchronization signal in the receive signal for a synchronization, the present invention provides a signal processing means configured to determine, based on the coarse synchronization signal, that section of the receive signal in which is located the fine synchronization signal, and to determine, on the basis of the fine synchronization signal, in the section of the receive signal, the position of the synchronization signal in the receive signal for a synchronization.

Preferably, the signal processing means is configured to detect the coarse synchronization signal in the receive signal so as to determine the section of the receive signal. The section of the receive signal is determined, for example, by a time of detection of the coarse synchronization signal (time of detection). To determine the position of the synchronization signal in the receive signal, the signal processing means is configured to detect the fine synchronization signal in that section of the receive signal which has been approximately determined on the basis of the coarse synchronization signal.

Since, in accordance with the invention, the coarse synchronization signal has a smaller bandwidth than the fine synchronization signal, detection of the coarse synchronization signal may be performed at a low processing rate in order to save signal processing resources. Detection of the fine synchronization signal, however, is performed at a higher processing rate, so that signal processing resources may be distributed in a targeted manner. For this purpose, the signal processing means is configured to perform the detection of the coarse synchronization signal in the receive signal at a first sampling rate and to perform a detection of the fine synchronization signal at a second sampling rate, the second sampling rate being higher than the first sampling rate. The term "sampling rate", which refers to the term "processing rate" will be used in the following to refer to a number of operations per time unit, i.e. the clock rate.

Since on account of the sampling theorem, a sampling rate is predefined by the signal bandwidth, the search for the coarse synchronization signal, which is preferably narrow-band, may be performed at a low sampling clock (processing clock). By contrast, the search for the fine synchronization signal is performed at a higher processing clock associated with a higher sampling rate. The reduction in expenditure achieved during the first synchronization phase (coarse synchronization) may therefore be significant in case of a large ratio of the bandwidths toward one another.

In accordance with the invention, the synchronization process is further accelerated, since in the coarse synchronization phase, the section in which is located the fine synchronization signal, is preferably determined in approximate terms only. To determine the section of the receive signal, it is therefore sufficient for the signal processing means to merely detect an occurrence of the coarse synchronization signal.

Preferably, the signal processing means is configured to conduct a correlation (for example a cross-correlation) between the receive signal and a signal correlated with the coarse synchronization signal, so as to detect the coarse synchronization signal in the receive signal. This correlation may be conducted continuously at a low sampling rate, so that the receive signal is searched at reduced expenditure, so as to approximately determine that section of the receive signal in which is located the fine synchronization signal.

In order to determine the position of the fine synchronization signal in the section of the receive signal, and thus the position of the synchronization signal in the receive signal, the signal processing means is preferably configured to perform a correlation between the section of the receive signal and a signal correlated with the fine synchronization signal. This correlation is performed, in accordance with the invention, at a higher sampling rate at a high processing clock so as to precisely detect the position of the synchronization signal.

The signal correlated with the coarse synchronization signal may be, for example, a copy of the coarse synchronization signal known to the receiver. By analogy therewith, the signal correlated with the fine synchronization signal may be a copy of the fine synchronization signal which is known to the receiver.

As has already been mentioned, the synchronization signal includes the coarse synchronization signal (also referred to by acquisition burst or A burst in the following) as well as the fine synchronization signal (also referred to by tracking burst or T burst). For example, the synchronization signal (preamble) consists of two parts, so that, in accordance with the invention, a divided search is conducted. The one part of the preamble exhibits a relative low bandwidth BA, which enables an on-line search, i.e. a search continuously conducted over a relatively long period until the fine synchronization signal has been found. For this purpose, for example, the respective subfrequency range of bandwidth BA is filtered out from the receive signal of the width B, and is sampled at a relatively low sampling rate (order of magnitude of BA). The further data processing and search must also be conducted at the clock BA. Due to this A burst, the approximate position of the other preamble (fine synchronization signal) may be determined. Due to the low bandwidth BA, however, the positional accuracy is very low. By contrast, the fine synchronization signal, for example, exhibits the full bandwidth B. A search window is opened up around the expected position, predicted by the A burst, of the T burst in the receive signal (section of the receive signal). Within this window, the receive signal of the full bandwidth B is sampled and processed at clock B. Because of the restriction to one window, processing becomes possible despite the high bandwidth, it now being possible to determine the position of the T burst with high accuracy. For this purpose, a correlation is calculated, as has already been mentioned by way of example. For example, at a bandwidth BA=6 MHz and a bandwidth B=77 MHz, a reduction in expenditure by a factor of 16 may be achieved with regard to processing at clock B.

BRIEF DESCRIPTION OF THE DRAWINGS

Further preferred embodiments of the present invention will be explained below in more detail with reference to the accompanying figures, wherein:

FIG. 5 is a calculating specification;

FIG. 7 is an example of a pre-trigger;

FIG. 8 is a calculating specification;

DESCRIPTION OF PREFERRED EMBODIMENTS

The synchronization device includes a first detection means 101 with an input, and an output coupled to a second detection means 103. The second detection means includes an input, coupled to the input of the first detection means, and an output.

Figure 1:
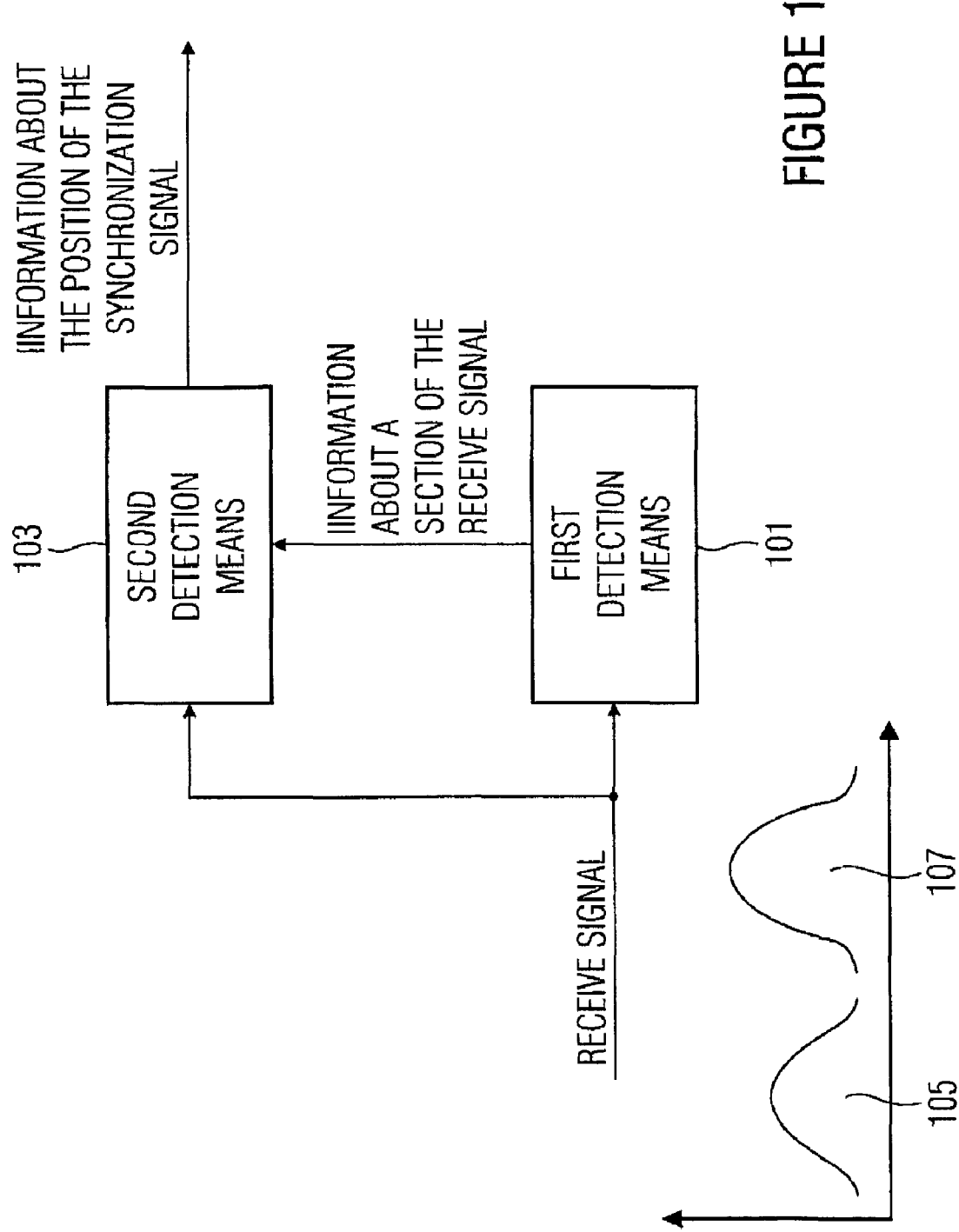
FIG. 1 is a basic block diagram of an inventive synchronization device for determining a position of a synchronization signal in a receive signal.

In accordance with the invention, a receive signal may be applied to the input of the first detection means 101, it being possible for the receive signal, as is represented in FIG. 1, to include a synchronization signal consisting of a coarse synchronization signal 105 and a fine synchronization signal 107.

The first detection means 101 is configured to detect the coarse synchronization signal in the receive signal so as to detect that section of the receive signal in which is located the fine synchronization signal. Once the coarse synchronization signal has been detected, the first detection means 101 provides information about a section of the receive signal in which is located the fine synchronization signal to the second detection means 103 via the output. The second detection means 103 is configured to detect a position of the fine synchronization signal in the section of the receive signal and to output information about the position of the synchronization signal, which is specified by the position of the fine synchronization signal in the section of the receive signal. The first detection means is configured to detect the coarse synchronization signal at a first sampling rate, i.e. at a first clock. The second detection means 103, by contrast, is configured to detect the position of the fine synchronization signal at a second sampling rate, i.e. at a second clock. The first sampling rate is lower than the second sampling rate (the first clock is lower than the second clock).

In accordance with the invention, the coarse synchronization signal comprises a bandwidth which is smaller than a bandwidth of the fine synchronization signal. To detect the coarse synchronization signal, the first detection means 101 comprises, e.g., a filter for filtering the receive signal so as to filter out the coarse synchronization signal from the receive signal. If the coarse synchronization signal is a band-pass signal with a center frequency, the coarse synchronization signal occupies a predetermined frequency range defined by the center frequency as well as by the bandwidth of the coarse synchronization signal. By means of the filter, a receive signal component occupying the predetermined frequency range is thus filtered out, it being possible for the filter to be a band-pass filter. If the coarse synchronization signal has been sent, the received version thereof is contained in the receive signal component after the filtering.

If the coarse synchronization signal is a band-pass signal, the first detection means includes, for example, a down converter for down-converting the receive signal component, which is also a band-pass signal, so as to obtain, for example, a receive signal component in the baseband, which receive signal component may be provided for detecting the coarse synchronization signal in the baseband.

However, the coarse synchronization signal may already be a baseband signal, so that the predetermined frequency range is in the baseband. In this case, the filter is a low-pass filter for filtering out a receive signal component in the baseband.

If the receive signal is an analog signal, the first detection means 101 may further include a sampling means so as to perform an analog/digital conversion of the receive signal component at the first sampling rate.

In accordance with a further aspect, the inventive signal processing means includes, for example, a controllable sampling means configured to sample the receive signal at the first sampling rate, when the first detection means 101 has not detected the coarse synchronization signal, and to sample the receive signal at the second sampling rate as soon as the first detection means 101 has detected the coarse synchronization signal. For this purpose, the synchronization device may further include a control means which, in response to a detection signal which indicates a coarse synchronization signal being detected and which may be output by the first detection means 101, controls the sampling means to set a higher sampling rate, for example the second sampling rate.

In accordance with a further aspect of the present invention, the receive signal may already be a digital signal sampled at the second sampling rate. To conduct the detection of the coarse synchronization signal at the first sampling rate, the first detection means 101 may further comprise a sampling rate converter, the sampling rate converter being configured to undersample the receive signal so as to obtain a receive signal at the first sampling rate.

To conduct a detection of the coarse synchronization signal in the receive signal, or in the receive signal component, which is part of the receive signal, the first detection means 101 includes, in accordance with a further aspect of the present invention, a detector configured, for example, to conduct a correlation between the receive signal component and a signal correlated, to a sufficient extent, with the coarse synchronization signal. The signal correlated with the coarse synchronization signal may be, for example, a copy of the coarse synchronization signal in the baseband or in the band-pass.

To indicate the detection of the coarse synchronization signal, the detector included in the first detection means 101 is configured, for example, to output a detection signal which includes, for example, information about that section of the receive signal in which is located the fine synchronization signal. The detector may be configured, for example, to output the detection signal when a value of the correlation exceeds a detection threshold. The value of the correlation may be, for example, a cross-correlation coefficient at the place of zero. Also, the value of the correlation may be normalized to a maximum value of the correlation, so that the detection threshold may be a relative magnitude preferably having, for example, a relative (i.e. normalized) correlation value of 10%. In other words, a power normalization may be conducted in such a manner that in an ideal case, wherein the signal received is not distorted compared to the transmit signal (signal received=factor*transmit signal), a maximum value of the normalized correlation value is achieved. In a non-ideal case, i.e. in the event that the receive signal is distorted, the normalized correlation value falls below the maximum value.

The detection signal provided by the first detection means 101 may indicate, for example, a time of detection at which the coarse synchronization signal has been detected, the time of detection indicating a start of that section of the receive signal in which is located the fine synchronization signal. The second detection means 103 is configured to receive the detection signal and to detect, in response to the detection signal, a position of the fine synchronization signal in that section of the receive signal which is specified by the time of detection.

In accordance with a further aspect of the present invention, the first detection means 101 is configured to activate the second detection means 103 so that the latter does not start detecting the position of the fine synchronization signal, and thus detecting the position of the synchronization signal in the receive signal, until after the time of detection.

Figure 2:
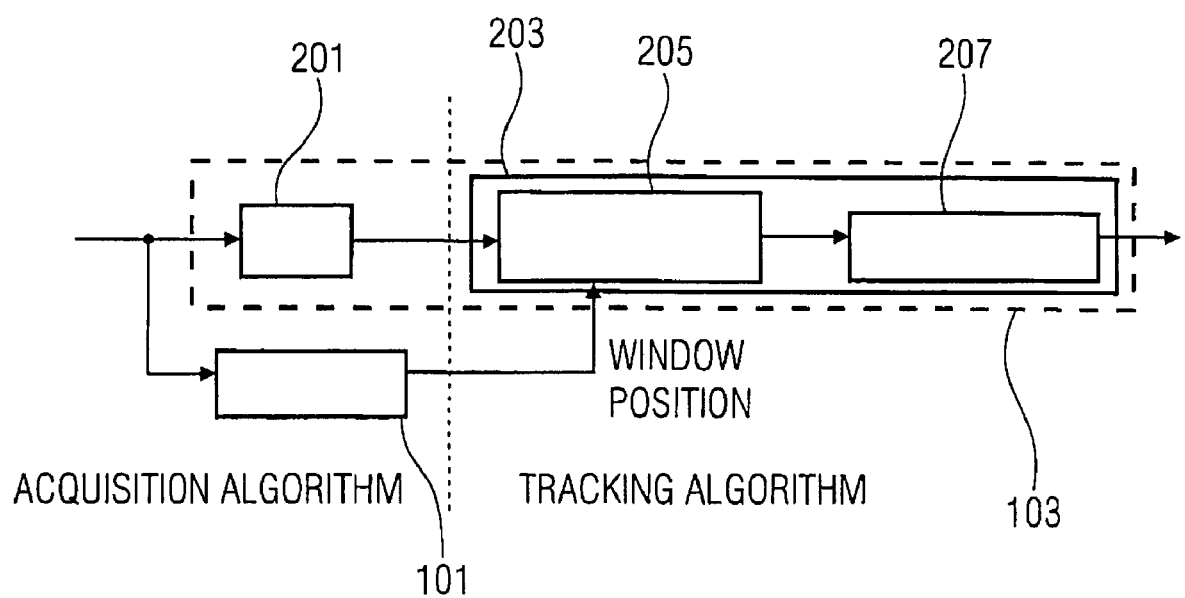
FIG. 2 is a block diagram of a synchronization device in accordance with a further embodiment.

FIG. 2 shows a block diagram of a synchronization device in accordance with a further embodiment.

The synchronization device includes the first detection means 101 as well as the second detection means 103. For illustrative reasons, the functionalities of the synchronization device have been separated by a vertical stroke in FIG. 2 so as to elucidate the inventive two-step approach. The functionalities drawn in to the left of the vertical stroke are essentially responsible for the acquisition (acquisition algorithm), i.e. for detecting the coarse synchronization signal in the receive signal. The functionalities drawn in to the right of the vertical stroke, by contrast, are responsible for accurately determining the position of the fine synchronization signal and thus the position of the synchronization signal in the section of the receive signal (tracking algorithm).

The second detection means 103 shown in FIG. 2 includes a delaying means 201 for delaying the receive signal, the delaying means being configured to compensate for a detection delay of the first detection means 101. The delaying means 201 may be, for example, a first-in first-out (FIFO) memory having a storage depth-which realizes the delay desired.

The delaying means 201 comprises an output which is coupled to a detector 203 included in the second detection means 103. The detector 203 is configured to detect a position of the fine synchronization signal in the section of the receive signal. For example, the detector 203 is configured to determine a correlation between the section of the receive signal and a signal correlated with the fine synchronization signal so as to detect the position of the fine synchronization signal.

The signal correlated with the fine synchronization signal will be, for example, a copy of the fine synchronization signal, it being possible for the copy to be a baseband signal or a band-pass signal, for example.

In addition, the second detection means 103 comprises a first correlator 205 in the embodiment shown in FIG. 2. The first correlator 205 includes an input coupled to the output of the delaying means 201, a further input coupled to an output of the first detection means 101, and a second output coupled to an input of a second correlator 207, or to an interpolation means 207.

The first and second correlators 205, 207 may be included, for example, in the detector described in connection with the embodiment shown in FIG. 1.

The receive signal applied at the input of the first detection means 101 and at the input of the second detection means 103 is, for example, a baseband signal which has been provided by the antenna unit and which has been down-converted into the (complex) baseband, and thus exists in I and Q components. For example, the receive signal has been sampled at a sampling clock B_cloc and is thus applied in a digital form.

The first detection means 101 is configured to perform the acquisition, i.e. to perform a continuous search for the A burst (coarse synchronization signals) for synchronizing to a transmitter. If the receive signal includes, for example, synchronization signals included in a plurality of transmitters, each synchronization signal comprising a coarse synchronization signal which occupies a different frequency band, the filter included in the first detection means 101 may be tunable to filter out the receive signal component which occupies the frequency range in which lies the coarse synchronization signal to be detected.

The first correlator 205 is configured to receive information about the section of the receive signal (window position) via the further input, so that the computationally more intensive part of the tracking algorithm, i.e. determining the position of the fine synchronization signal, is conducted only in the sections of the receive signal (windows). The first correlator 205 is configured to conduct a search for the T burst in the raster B_samples. To this end, the first correlator 205 is configured to determine a correlation between the section of the receive signal and a signal correlated with the fine synchronization signal so as to find the fine synchronization signal (T burst). The second correlator 207 is configured to conduct a fine correlation in the oversampling clock. The second correlator 207 works with the correlation values which have been determined by the first correlator 205, and searches for the T burst in a very fine raster.

The acquisition algorithm conducted, e.g., by the first detection means 107 uses the coarse synchronization signal (A burst) in the receive signal to predict the approximate position of a T burst in the receive signal.

Before being input into the tracking algorithm, the receive signal is delayed in a calculated manner with FIFO 201. Due to the positional prediction of the acquisition algorithm, the tracking algorithm cuts out a window from the receive signal, within which window the T burst is searched for.

In accordance with the invention, the search is conducted in two steps. In the first step, the correlation values for the T burst in the raster B_sample are determined in the predicted window. The correlation is conducted by the first correlator 205.

In accordance with a further aspect of the present invention, the second correlator 205 is configured to determine the correlation on the basis of partial correlations so as to clearly reduce the influence of frequency offset on the correlation values. The frequency offset is a frequency difference between the transmitter and the receiver. To this end, the first correlator 205, which is included, for example, in the above-described detector, is configured to determine a first partial correlation between a first subset of receive signal values in the section of the receive signal, and a first subset of values of the signal correlated with the fine synchronization signal, and to determine a second partial correlation between a second subset of receive signal values in the section of the receive signal and a second subset of values of the signal correlated with the fine synchronization signal. The respective first subsets and second subsets differ by at least one value. Preferably, the first subsets and the second subsets are different sections of the respective signals. The correlation is determined by an overlap of the first and second partial correlations. To eliminate the phase offset, the detector and/or the first correlator 205 may be configured to detect a phase relation between corresponding values of the first and second partial correlations, the phase relation including a frequency offset between the transmitter and the receiver. The corresponding values of the first and second partial correlations are partial correlation values occurring at the same locations of the respective partial correlations. On the basis of the phase relation determined, the detector and/or the first correlator 205 is configured to eliminate the phase relation by weighting the first partial correlation or by weighting the second partial correlation so as to reduce an influence of the frequency offset on the values of the correlation. The respective correlation values are assessed, for example, by means of an inverse phase relation.

In accordance with a further aspect of the present invention, the detector included in the second detection means 103 includes an interpolator for interpolating between the values of the correlation so as to obtain a fine correlation and to detect, with higher accuracy, the position of the fine synchronization signal on the basis of the fine correlation. In the embodiment shown in FIG. 2, this interpolation is conducted, for example, by the second correlator 207, which may be configured to perform oversampling, wherein zeros are inserted between the values of the correlation, so as to perform an interpolation. For the purposes of the interpolation, the interpolator may be included in the second correlator 207 and may be configured, for example, as an interpolation filter.

In accordance with a further aspect of the present invention, the fine synchronization signal may further include information which is sent out along with the synchronization information. This information may be coded, for example, by a phase relation between successive values of the fine synchronization signal. The phase relation may be, for example, a phase jump by 180°, which may occur at a predefined position in the fine synchronization signal, so that, e.g., a second half of the fine synchronization signal has been rotated by an additional 180°, for example by a multiplication by −1. The second detection means 103 then is configured to detect the information by detecting the phase relation. This preferably involves detecting the phase jump, so that the information may be retrieved from the phase decoding.

In accordance with a further aspect, the second detection means 103 is configured to derive quality values for a receive quality from the correlation. Here, a channel attenuation may be derived, for example, by means of the correlation, which has an influence on the quality of the receive signal. In addition, a power of additive spurious signals, e.g. noise, which also has an influence on the quality of the receive signal, may be detected, for example, by means of the correlation.

The correlation values, the estimated phase relation, which corresponds to an estimated channel bit, as well as the quality values are determined by the second correlator 205. In addition, the first correlator 205 may be configured to output signalization information (signalization flags). This information may be passed on, for example, to a software module, which interpolates the correlation values in a raster very much finer than B_Sample (fine correlation) and thus may find a highly accurate estimation of a time of arrival of the synchronization signal. However, the interpolation mentioned may also be determined in the second correlator 207 (or in the interpolation means 207). In addition, further quality values may be determined from the correlation values.

In accordance with a further embodiment, the second detection means is configured to output a position signal indicating a position of the fine synchronization signal in the section of the receive signal so as to indicate the position of the synchronization signal in the receive signal.

In accordance with a further aspect, the present invention provides a receiver unit which comprises, e.g., a correlation board, a processor unit and an optical internet interface. In addition, the receiver unit may include a clock and trigger generator which provides all necessary clock signals for an antenna unit and the receiver unit. The signals may be distributed, e.g., via optical waveguides or coaxial cables.

For better integration, the correlation board on which the functionalities necessary for a correlation calculation are combined, may be implemented, for example, as a pure PCIx plug-in card. Thus, all existing aeration and deaeration mechanisms of the processor unit may be put to good use. By using commercial optical Internet plug-in cards (10/100 Mbps) a control link is also directly applied to the processor unit.

In the correlation board, for example, all algorithms for determining the transmit time (synchronization) may be arranged as software modules, and may be ported based on a commercially available computing platform. Preferably, large parts of the algorithms are implemented as hardware modules on an FPGA platform (FPGA=field programmable gate array).

In addition, the receiver unit may be configured to process signals from a plurality of transmitters, for example 150 transmitters. If, for example, signals are to be received from a specific transmitter, synchronization is performed, in accordance with the invention, to this specific transmitter using the above-described inventive concept.

As has already been mentioned, parts of the algorithms for determining the transmit time (synchronization) are implemented in hardware. The necessary further steps are conducted, for example, by a processor. This processor may be a PPC processor, for example. However, it need not necessarily be a PPC; it is also possible to use a conventional processor variant.

In the implementation, the hardware module comes up once for each transmitter communicating with the inventive reception unit. By contrast, the software may be implemented such that it comes up only once and evaluates all transmitters. If need be, an interface between the hardware and the software modules may also be shifted for reasons of a more favorable implementation. For example, not all partial relation values are added up coherently in the FPGA (with rotation term, phase relation and so on) but only in the software.

In the following, the inventive triggering and receive-signal windowing (section of the receive signal) will be described.

The acquisition algorithm passes on a pre-trigger signal a_pre_trigger, which is triggered precisely a_predist B_samples, to the tracking algorithm before the tracking algorithm is to open the next receive-signal window. This pre-trigger is activated after an A burst has been found.

Figure 3:
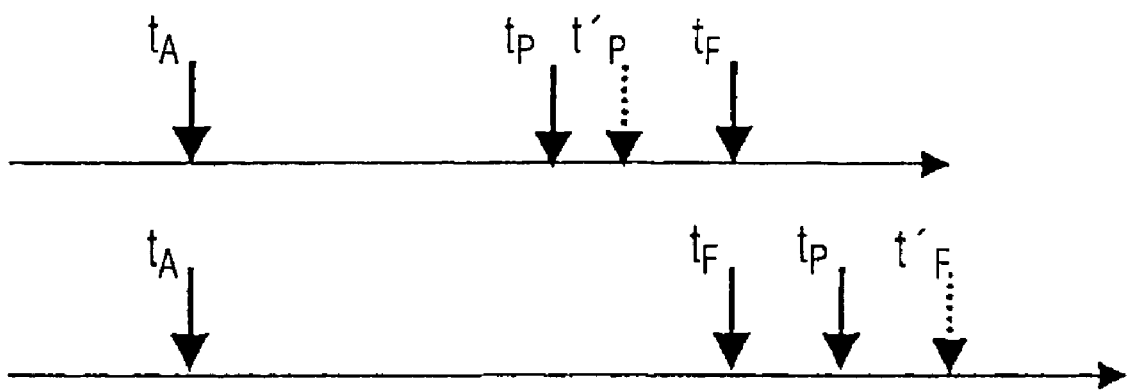
FIG. 3 shows the temporal connections.

When triggering this window start, two situations may arise, depending on the implementation and configuration of the transmitter. FIG. 3 illustrates the temporal connections.

In the top diagram of FIG. 3, $t_A$ describes the start time of the A burst in the receive signal, $t_F$ is the correct start time of the window to the T burst, and $t_P$ is the time when the acquisition algorithm has recognized the A burst and could trigger the pre-trigger. The period $t=t_P-t_A$ is determined by the distance of the A burst to the subsequent T burst, the window already starting B_samples before the correlation sequence of the T burst, and is thus specified by the configuration of the transmitter.

One always assumes, at the input of the tracking algorithm, that the pre-trigger comes exactly B_samples before the desired window start. Depending on the implementation and transmitter configuration, either the situation in the top diagram or that in the bottom diagram of FIG. 3 may arise as to when the acquisition algorithm finds the A burst and when the window for the T burst must be started.

If the distance $t_F-t_P$ is larger than a_predist [in B_samples], the A algorithm would trigger the pre-trigger too early. In this case, the A algorithm must delay the pre-trigger up to a time $T_{P'}$, so that $t_F-T_{P'}$=a_predest, and pass on the delayed trigger to the T algorithm. In this case, the FIFO puffer before the input of the tracking algorithm must absolutely not delay the input signal.

If the distance $t_F-t_P$ is <a_predist, the acquisition algorithm would trigger the pre-trigger too late. In this case, the FIFA buffer must delay the input signal by a_predest-($t_F-t_P$) the P samples, so that behind it, the correct window start occurs at the time $t_F$, with $t'_F-t_P$=a_predist. Here, the acquisition algorithm triggers the pre-trigger without delay as soon as it finds an A burst, i.e. at the time $t_P$.

Figure 4:
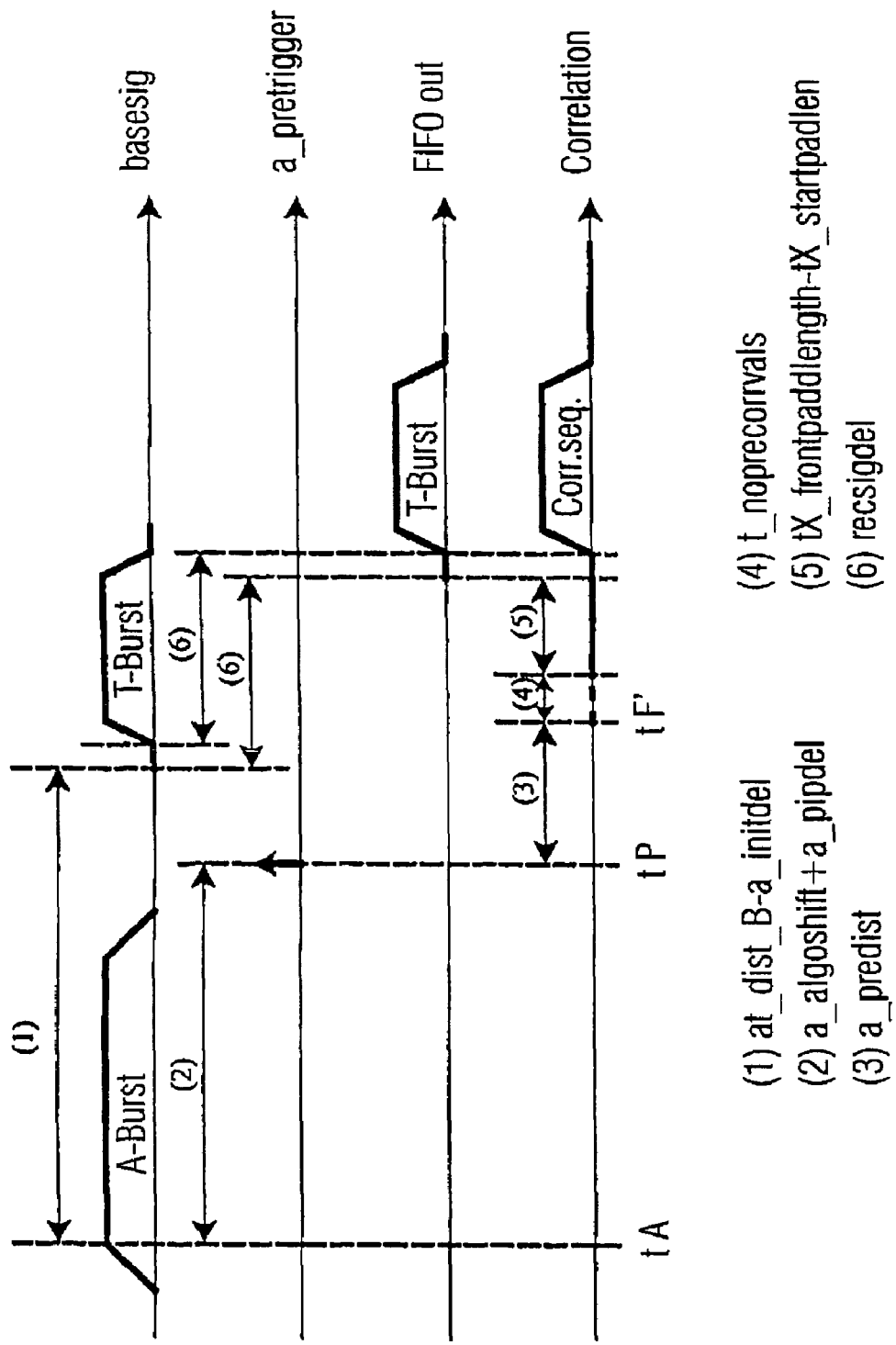
FIG. 4 shows four time signals, by way of example.

In FIG. 4 four time signals are detected by way of example: The (undelayed) receive signal basesig, the pre-trigger signal a_pre-trigger, the output signal of the FIFO as well as the position of the correlation sequence with which T burst is correlated in the receiver (during the partial correlation calculation).

The above figure is based on the assumption that recsigdel (cf. FIG. 4) is positive, that what is at hand is the bottom case in FIG. 3. As has been described above, again, the start of the A burst $t_A$ (measured in its first valid B_sample, i.e. without transients of the filters), time $t_P$ of the pre-trigger, and the desired window start $t'_F$ in the receive signal delayed (by the FIFO) are drawn in here.

It should be noted that, for implementation reasons, the T burst starts with a few padded zeros. The T-burst start, however, already is the first B_sample, i.e. the first padded zero.

The distance (1) between the two burst starts (with the A burst, measured from the first valid B-sample without filter transients, with the T burst, on the other hand, measured from the first zero padded at the front) is a_dist_B−a_initdel (in B_samples) and is thus determined solely by the transmitter configuration. Here, at dist_B is the value of at_dist (in S_cycles) converted to B_cycles and thus cannot become an integer.

By contrast, the distance (2) of $t_P-t_A$ is a mere processing delay of the A algorithm, i.e. is dependent on the implementation. Its value is a_algoshift+a_pipdel.

(3) marks the distance $t'_F-t_P$=a_predist (in B-samples)

In $t'_F$, the windowing of the receive signal starts, and the correlation sequence is applied to the receive signal "flush left". The windowing is effected such that an optimum overlap may be expected between the T burst received and the correlation sequence halfway between the calculated t-nocorrvals correlation values. Thus, the "advance" is t_nocorrvals/2 correlation values, which corresponds to an advance (4) of t_noprecorrvals=t_nocorrvals/2 B_samples in the receive-signal window.

Eventually, what also must be considered is that the T burst in the transmitter and the associated correlation sequence in the receiver are padded with zeros for different lengths. For the T burst X=0/1 of the transmitter considered, the length of the zero padding at the start has the value tX_startpadlen, for the associated correlation sequence in the receiver, the zero-padding length is tX-frontpaddlength. Accordingly, the correlation sequence already starts tX_frontpaddlength–tX_startpadlen B-samples before the delayed T burst, this value always being the same for a transmitter for X=0 and 1. Even with the FIFO delay, this difference in length (5) of the zero padding must be taken into account. Because of this longer zero padding in the correlation sequence, the receive-signal window must also become considerably longer than T burst.

In addition, FIG. 4 shows the delay (6) in the FIFO. This delay recsigdel (in B-samples) may, as has been depicted in FIG. 5, be calculated, at_dist_Brnd being the rounded value of at_dist_B.

Figure 6:
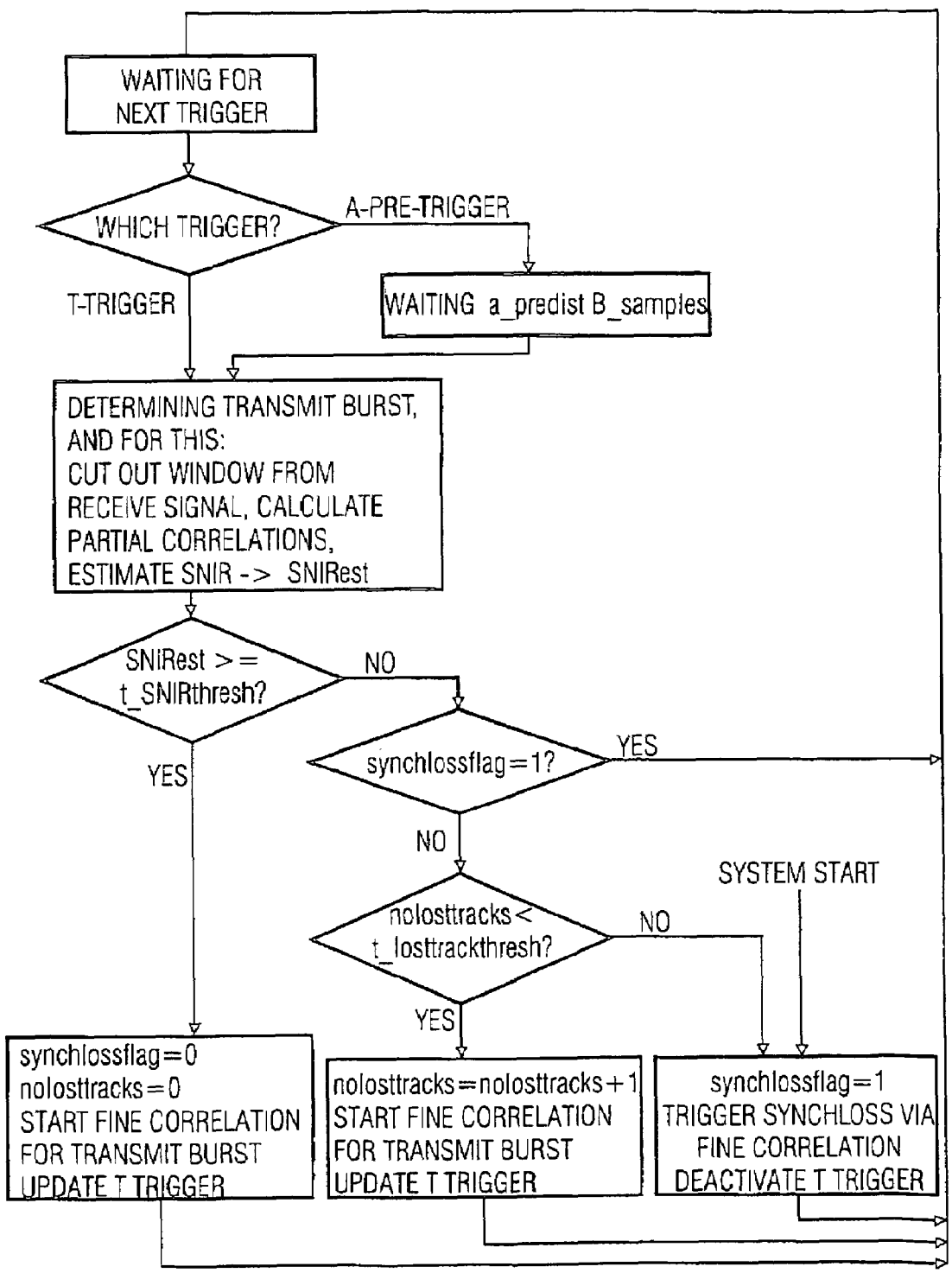
FIG. 6 is a flow chart of the inventive signal processing.

FIG. 6 shows a flow chart of the inventive signal processing:

the window start of the receive signal may be triggered either by the T algo itself or by the A algo for starting the window, the A algo does not use a trigger, but a pre-trigger which is activated a predefined number of a_predist B_samples before the window start. This is done to achieve that even with a maximum frequency offset maxfreqoffsppm and a maximum-length prediction in the T algo (i.e. over t_losttrackthresh+1 T-burst periods of t_burstperiod_B B-samples each), the pre-trigger of the A algo always comes before the trigger of the T algo, i.e.

$$a\_predist >= (t\_lostttrackthresh+1) * t\_burstperiod\_B * maxfreqoffsppm * 10^{-6}.$$

The motivation of the pre-trigger and its function will be explained in more detail in the example in the following section.

exiting the waiting condition is triggered by the first trigger, i.e. either by the T trigger or by the A pre-trigger once the A pre-trigger has ended the waiting condition, a_predist B_samples must be waited before the start of the receive-signal windowing; in the case of the T trigger, the window start may be performed immediately in the main part of the sequence control a determination is first made as to which of the two T burst programmed into the mini-transmitter has been sent (No. 1 or No. 2); the correlation and all further calculations are to be performed for the parameters of this T burst. For determining the T burst radiated off, a flag t_choice is used which may be calculated within the sequence control, as is described in [RD6].

for the purposes of correctly determining (from the two possibilities) the T burst radiated off by the transmitter, a counter a_multipl_cntr as has been described in [RD6] must be carried along within the sequence control; in contrast to the mini-transmitter, however, it is sufficient in the receiver for a_multipl_cntr to be reset to 0 before the $1^{st}$ T burst of an acquisition period (and not already before the A burst)

in the receive-signal windowing, t_paddcorrseqlen+t nocorrvals–1 B_samples are copied into a buffer as of the current receive-signal sample, wherein t_paddcorrseqlen is the length of the zero-padded correlation sequence t_nocorrvals is the number of correlation values to be calculated.

the SNIR estimation is conducted in the FPGA in accordance with the formula $$SNIRest = t\_SNIRcorrfact * maxsqcorr / abs(recenerg * t\_corrseqenerg - maxsqcorr)$$

Here,

SNIRest is the estimated SNIR (in a linear measure)

maxsqcorr is the maximum squared correlation magnitude measured in the partial-correlation algorithm abs( ) is the magnitude function for circumventing numerical problems (if the denominator of the above term becomes negative)

recenerg is the energy, measured in the partial-correlation algorithm, in the receive signal over the length of the (zero-padded) correlation sequence t_corrseqenerg is the energy of the correlation sequence stored; this value depends on the transmit burst, i.e. when determining the transmit burst radiated off, the hardware module chooses from the two possible values t_SNIRcorrfact is a correction factor taking into account the length of the zero padding in the correlation sequence; this value depends on the transmit burst, i.e. when determining the transmit burst radiated off, the hardware module chooses from the two possible values a T burst is regarded as valid and/or as found when the estimated SNIRest is larger than a threshold t_SNIRthresh; this threshold must be selected such that on the one hand, a sufficient number of T bursts are still declared as valid, but that, on the other hand, the likelihood of erroneously finding a T burst at a position where there is no T burst remains small.

if a T burst is found (SNIRest>=t_SNIRthresh), the T algo is again synchronized and starts predicting the next window starts by means of its T trigger; in addition, the correlation values are passed on to the software module "fine correlation" for a more accurate analysis the passing-on of the correlation values to the fine correlation represents the unidirectional interface between the FPGA hardware and software with valid bursts, the T trigger for the next window start is predicted based on the position of the correlation maximum found in the partial-correlation algorithm; t_burstperiod_Brnd B_samples are added to this position for a T-burst period, and t_noprecorrvals B_samples are deducted, so that the window of the width of t_nocorrvals=2*t_noprecorrvals correlation values is situated almost symmetrically around the predicted next correlation maximum for ascertaining whether the T algo is being synchronized, a flag synchlossflag is used, which has a value of 0 in the case of a synchronization, and is 1 if the T algo is not synchronized while being synchronized, the T algo keeps track, with the variable nolosttracks, of how many of the last T bursts in succession have been lost, if the current T burst is not found (SNIRest<t_SNIRthresh), a verification is made as to whether the T algo is being synchronized; if this is not so, one proceeds to waiting for the next A pre-trigger if, on the other hand, the T algo is still being synchronized, one checks to see whether along with the loss of the current T burst it also loses the synchronization; this is so if it had already lost t_losttrackthresh in succession, i.e. nolosttracks >=t_losttrackthresh; in this case, the fine-correlation software is instructed, by means of synchlossflag==1, to inform the so-called ZRE about the loss of the synchronization; thus, a so-called baler in the ZRE knows that from that point on up to a re-acquisition there will be no TOA values coming from this receiver for the time being; moreover, the T algo deactivates its T trigger, so that now the T algo may be triggered again only by successful re-acquisition by the A algo if no more than t_losttrackthresh T burts have been lost in succession up to (inclusively) the current T burst (nolosttracks<t_losttrackthresh), then the fine correlation is activated for the correlation values calculated even if the T burst is not regarded as valid, and the fine correlation therefore is likely to determine very poor quality values; in addition, the T trigger for the next window start is predicted on the basis of the current window start: t_burstperiod_Brnd B_samples (for a T-burst period) are simply added to this position.

FIG. 7 shows an example of a pre-trigger of the A algorithm for t_losttrackthlesch=2.

(1) t_burstperiod_B (2) a_predist (3) T trigger and correct window start of the last T burst found (4) wrong (predicted) T trigger of T bursts not found (5) correct window start for T bursts not found (6) pre-trigger of the A algo derived from A burst.

The image shows the worst case of how the (predicted) trigger of the T algo may proceed from the correct window start: In (3), a T burst is actually found for the last time—here, the T trigger and the correct window start still correspond. Now the next window start is predicted over t_burstperiod_B B_samples and, in (4), a T trigger is triggered in each case. If we have the maximum frequency offset, then the correct window start, however, does not occur in (4), but in (5), respectively, which moves increasingly further away from (4) due to the extended T-burst period. Let us assume that when triggering in (4), no T bursts are found, respectively. The last T trigger is predicted in (4'), i.e. t_losttrackthresh+1 (here three) T-burst periods after the last T burst (3) found; no further predictions are ever made because after t_losttrackthresh+1 T bursts lost in succession, there is a synchronization loss, and the T trigger is deactivated from that point on (now only the A algo may trigger). The correct window start associated with (4') is (5'); let us assume that there is an A burst before this T burst. Then, the A pre-trigger must occur in (6), i.e. before (4'), for the correct window start to occur in (5') instead of at the wrong predicted T trigger in (4'). This distance between (6) and (5') is a_predist >=(t_losttrackthresh+ 1)* t_burstperiod_B*maxfreqoffsppm* 10−6.

The processing delay, which results from performing the acquisition algorithm and needs to be taken into account in the block FIFO, will be described below by the parameters a_algoshift and a_pipdel.

A_algoshift indicates the difference between the start of the acquisition burst and the found correlation peak in B_samples, which results from the filter lengths used at different frequencies, respectively, from the length of the acquisition burst and from the parameter windowlength_total, whereas a_pipdel indicates the delay in B_samples, which results from the implementation of the receiver algorithm in the hardware.

FIG. 8 illustrates a calculation of the difference.

Figure 9:
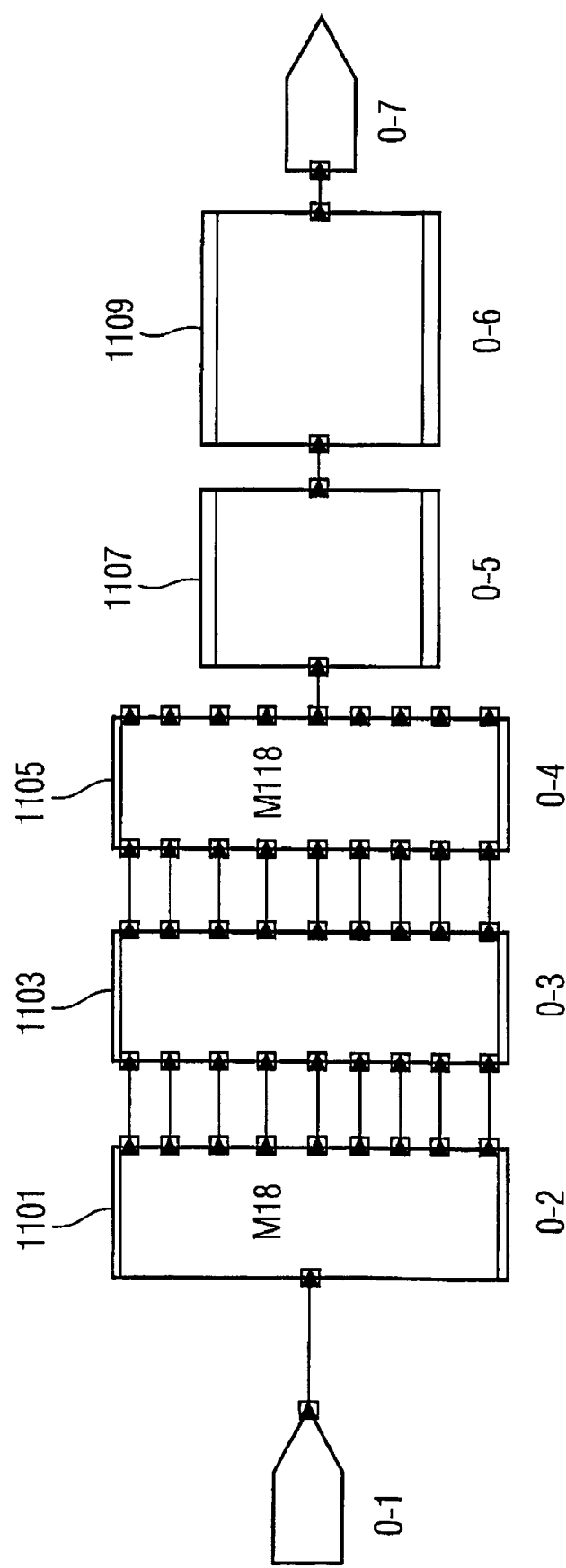
FIG. 9 shows a basic architecture of an inventive receiver for the acquisition.

FIG. 9 depicts a basic architecture of an inventive receiver for the acquisition.

The receiver includes a processing block 1101 with an input and a plurality of outputs coupled to a filter 1103. The filter 1103 comprises a plurality of outputs coupled to a correlation block 1105. The correlation block 1105 includes an output coupled to an oversampling means 1107. The oversampling means 1107 comprises an output coupled to a further processing block 1109. The further processing block 1109 comprises an output.

The signal received by the processing block 1101 is undersampled, and an fs/4 mixture is performed, fs designating the sampling frequency. The resulting signal is divided up into polyphases, the polyphases being fed to the filter 1103, which may be a matched filter, via the plurality of outputs. The filter 1103 includes, for example, a plurality of individual filters, each of the individual filters being associated with the respective polyphase. On the basis of the signals filtered, a correlation is performed in the correlation block 1105, which correlation is then oversampled in the oversampling means 1107. The signal provided by the correlation block 1105 is fed to the further processing block 1109. The further processing block 1109 is configured to calculate the positions of the correlation maxima and to output a carrier signal.

The input 0-1 passes on the receive signal, which has been mixed into the complex baseband, to level 0-2 at sampling clock B_clock.

At the output 0-7, the carrier signal obtained at level 0-6 for one of the 150 transmitters is passed on, at the sampling clock B_clock_4, to that block in which partial-correlation values are calculated in the tracking algorithm. In the event of a correlation maximum being detected, the carrier signal has the value of 1, otherwise the carrier signal is identical with 0. In order to be able, on account of this carrier signal, to cut out that section within which the tracking burst following the acquisition burst detected is to be searched for, the signal applied at the input 0-1, i.e. the "receive signal", must be delayed in dependence on the group runtimes of the filters used, on the time required for the acquisition algorithm, etc.

As has already been mentioned, the receiver depicted in FIG. 9 is configured to conduct an acquisition (coarse synchronization) in the event of a plurality of transmitters to which a synchronization is to be conducted. Therefore, level 0-4 has one output, for example, for each of the 150 transmitters. Thus, blocks 0-5 and 0-6 as well as outputs 0-7 also exist 150 times.

In accordance with a further aspect, the present invention provides a device for synchronizing a receiver and a transmitter, the transmitter being configured to send out a synchronization signal based on a coarse synchronization signal for a coarse synchronization and on a fine synchronization signal for a fine synchronization.

The device for synchronizing includes a sampling means for sampling a receive version of the synchronization signal to provide a receive signal, a signal processing means as has been described above, the signal processing means being configured to provide a position signal indicating a position of the synchronization signal in the receive signal, and a control means for controlling a sampling time of the sampling means in dependence on the position signal to synchronize the receiver and the transmitter.

Thus, a block synchronization may be achieved by controlling the sampling times of the sampling means.

In addition to a receive structure, the present invention provides, in accordance with a further aspect, a device for generating a synchronization signal which may be sent out in order to synchronize a receiver and a transmitter. The device includes a means for providing a coarse synchronization signal having a first bandwidth and a fine synchronization signal having a second bandwidth, the second bandwidth being smaller than the first bandwidth, and a means for providing the synchronization signal using the coarse synchronization signal and the fine synchronization signal.

The synchronization signal here includes the coarse synchronization signal as well as the fine synchronization signal as well as any desired combination of the two signals, the means for providing being configured to provide the fine synchronization signal temporally after the coarse synchronization signal, for example. This is to ensure that when sending out the synchronization signal, the coarse synchronization signal, which is provided for a coarse synchronization in the receiver, is sent out before the fine synchronization signal, so that, in the receiver, the coarse synchronization signal is initially detected so as to specify a section of the receive signal in which is located the fine synchronization signal, and to perform a synchronization using the fine synchronization signal.

The means for providing may be configured to join the fine synchronization signal to the coarse synchronization signal, so that the preamble (synchronization signal) that results consists of, e.g., two parts. The means for providing may further be configured to join together a plurality of fine synchronization signals and/or to join a plurality of copies of the fine synchronization signals, so that a more accurate determination of the position of the fine synchronization signal is possible in the receiver.

In accordance with a further aspect, the means for providing is configured to provide the fine synchronization signal temporally after the coarse synchronization signal such that there is a predetermined time interval between a provision of the coarse synchronization signal and a provision of the fine synchronization signal. This time interval may be identical with, for example, a detection delay in the receiver and is introduced in order to still be able to detect the fine synchronization signal after the coarse synchronization signal has been detected in the receiver. In addition, the means for providing may be configured to provide a plurality of fine synchronization signals temporally after the coarse synchronization signal. The fine synchronization signals may either be directly successive, or a time delay again may be set between the fine synchronization signals, with which a distance between successive fine synchronization signals has, for example, an order of magnitude of a delay accompanying a determination of position of the fine synchronization signal in the section of the receive signal.

The means for providing may further be configured to provide the plurality of fine synchronization signals for example as a sequence, by temporally joining copies of the fine synchronization signal, so that, as has already been mentioned, no delay occurs between the fine synchronization signals.

In accordance with a further aspect, the means for providing includes a pulse shaping filter for filtering the coarse synchronization signal and/or the fine synchronization signal. The pulse shaping filter may further be configured to filter the entire synchronization signal. The pulse shaping filter may be, for example, a cosine roll-off filter having a roll-off factor of 1. In this case, the filter characteristic has a pure cosine shape in the frequency range.

In accordance with a further aspect of the present invention, the pulse shaping filter has a variable characteristic, so that the fine synchronization signal and the coarse synchronization signal are filtered differently.

In accordance with a further aspect, the means for providing is configured to generate the coarse synchronization signal from a data sequence, and the fine synchronization signal from a further data sequence, a bandwidth of the data sequence being smaller than a bandwidth of the further data sequence.

In accordance with an embodiment, the means for providing includes a memory in which the data sequence and the further data sequence are stored and may be fetched. Here, the coarse synchronization signal may be the same as the data sequence, for example, and the fine synchronization signal may be the further data sequence.

The means for providing may further include a generator configured to generate the data sequence and/or the further data sequence. The generator may be configured, for example, to generate the data sequence from a Galois field having four elements. In addition, the generator may be configured to generate the further data sequence from a Galois field having four elements or more than four elements. However, use may also be made of a Galois field having two elements.

For generating the data sequence and/or for generating the further data sequence, the generator may include a shift register, the generator being configured to set an initial occupation of the shift register. The shift register may be wired in a suitable manner, so that depending on the respective initial occupation, various data sequences and various further data sequences may be realized.

The means for providing may further include an associating means to associate a complex-valued number with each element of the data sequence, so as to obtain a complex-valued sequence and/or to associate a complex-valued number with each element of the further data sequence, so as to obtain a further complex-valued sequence. In other words, the associating means is configured to map the data sequence to the complex-valued sequence and to map the further data sequence to the further complex-valued sequence, the data sequence and the complex-valued sequence having the same number of coefficients, and the further data sequence and the further complex-valued sequence having the same number of coefficients. The number of coefficients of the complex-valued sequence may differ from the number of coefficients of the further complex-valued sequence. However, both complex-valued sequences may comprise the same number of coefficients.

The coarse synchronization signal and/or the fine synchronization signal may be band-pass signals or baseband signals. If the coarse synchronization signal is a band-pass signal, the means for providing further includes an up-converter so as to generate the coarse synchronization signal by up-converting the complex sequence. The up-converter may further be configured to generate the fine synchronization signal by up-converting the further complex-valued sequence. Since the coarse synchronization signal is more narrow-band than the fine synchronization signal, the coarse synchronization signal occupies a band-pass range having a center frequency which may differ from a further center frequency of a further frequency range occupied by the fine synchronization signal. In accordance with a further aspect, however, the center frequency and the further center frequency may be the same.

In accordance with a further aspect, the means for providing may be configured to provide a further fine synchronization signal, the bandwidth of which is larger than the bandwidth of the coarse synchronization signal. The further fine synchronization signal may differ from the fine synchronization signal and may be orthogonal to the latter, for example. The means for providing is then configured to treat the further fine synchronization signal like the fine synchronization signal, as has been described above.

In accordance with a further aspect, the means for providing may be configured to code information by a phase change between successive values of the fine synchronization signal in the fine synchronization signal. For example, the means for providing is configured to code the information by of a phase jump by 180° between a number of values of the fine synchronization signal and a further number of values of the fine synchronization signal. By means of a phase jump, a bit, for example, may thus be transmitted in addition to the synchronization information. In accordance with a further aspect, however, the fine synchronization signal may comprise a plurality of phase jumps, so that an information sequence is coded.

In accordance with a further aspect, the means for providing may be configured to code information by a phase change, for example a phase jump by 180°, between successive values of the coarse synchronization signal. In this manner, the receiver is enabled to detect additional information by a phase-change detection.

The inventive device for generating the synchronization signal may further include a transmitter for sending out the synchronization signal. The transmitter may be a radio transmitter, for example.

In accordance with a further aspect, the present invention provides a transmitting means having a device for generating a synchronization signal, as has been described above, a control means for controlling the means for providing, so that a predetermined temporal sequence of the coarse synchronization signals and the fine synchronization signals is achieved, as well as a transmitter to send out the synchronization signal which includes the temporal sequence of the coarse synchronization signals and the fine synchronization signals.

In accordance with the invention, the transmitter is configured to send out narrow-band acquisition bursts with which low-expense synchronization (acquisition) to the signal of a transmitter is possible. By means of the A burst, the position of the subsequent T burst is to be predicted. The transmitter sends out broad-band tracking bursts. These are such that the time of their arrival in the receiver may be accurately measured. The transmitter further transmits data, which have been keyed into the T burst, for example, (keyed-in data transmission), at a lower data rate. The data may be keyed in using the phase change already mentioned.

The transmitter may further be configured to transmit data, for example in a future toy system, by means of a burst transmission system, which may be received at very low expense (burst-type data transmission).

The acquisition burst (coarse synchronization signal) serves to synchronize—the synchronization being realizable at low expense—the receivers to individual transmitters, for example in a multi-transmitter, multi-receiver scenario. The acquisition is to provide an approximate estimated value for the transmit time of the tracking burst used for determination of position. The acquisition bursts serve both for initial synchronization (acquisition) and for re-synchronization (re-acquisition) in the event that the tracking is lost.

If the receiver is to be sychnronizable to a plurality of transmitters, the individual transmitters must be distinguishable. The individual transmitters, which are each configured to send out the inventive synchronization signals, preferably utilize different sequences of a specific length so as to enable a distinction. For reasons of a receiver implementation at low cost, these sequences are considerably more narrow-band than the tracking bursts (fine synchronization signals). In order to nevertheless be able to achieve a sufficiently good distinction, the individual transmitters may utilize, e.g., 9 different "subcarriers" of the frequency band used.

The allocation of the relevant parameters (sequence, frequency) may be effected, for example, by a central database which ensures that no two transmitters use the same sequence at the same frequency. Additionally, further boundary conditions may arise in the sequence allocation, which are smoothed out by means of external programming.

The transmit sequences (data sequences and/or further data sequences) may be generated, for example, by means of a generator using a software program with which digital signal processing and/or signal transmission may be simulated. For this purpose, transmit sequences from GF 4 (Galois field having four elements) are used, for example. The polynomials for generating the sequence may be found, for example, in "4-Phase-Sequences with near-optimum Correlation Properties" by Serdar Boztas, Roger Hammons and Vijay Kumar, IEEE Transactions on Information Theory, vol. 38, No. 3, May 1992, pages 1101 et seq. For example, one may take the polynomials given there and may change the order, e.g. one may generate [32113111] in software from a given [11131123].

The generator polynomial is defined to be [32113111]. The various sequences (data sequences) are obtained by varying the initial occupation of the shift register. Care should be taken that no internal register value comes up in any sequence already generated, since the sequences resulting in such a case would no longer be uncorrelated.

The symbol rate is specified, for example, to be B_clock_48, i.e. $f_{symb}=1/48*B\_clock$. The length of the transmit sequences, which is possible at any rate, is 511 symbols, for example.

As has already been mentioned, the acquisition bursts may be spectrally formed. To this end, the sequence consisting of elements of the collection of {0,1,2,3} now is mapped, filtered and sent out at a specific carrier frequency.

In the mapping (association), the associated symbol is generated from an element by means of the mapping. By way of example, FIG. 10 illustrates a specification in accordance with which the sequence may be mapped.

Figures 10, 11:
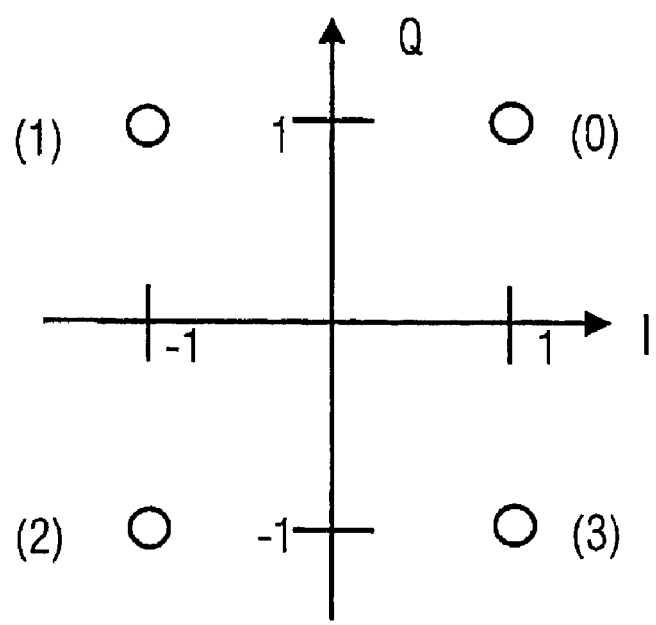
FIG. 10 is an association specification.
FIG. 11 is a constellation diagram.

FIG. 11 depicts a constellation diagram in which the specification of points is illustrated.

Pulse shaping is effected by a square-root raised cosine filter with a roll-off factor $\alpha=1.0$. The associated formula for the transfer function is $$H(f) = 1 \text{ for } |f| < f_N(1-\alpha)$$

$$H(f) = \left\{\frac{1}{2} + \frac{1}{2}\sin\frac{\pi}{2f_N}\left[\frac{f_N - |f|}{\alpha}\right]\right\}^{1/2} \text{ for } f_N(1-\alpha) \le |f| \le f_N(1+\alpha)$$

-continued $$H(f) = 0 \text{ for } |f| > f_N(1+\alpha)$$

$$f_N = \frac{B\_clock\_48}{2}$$

$$H(f) =$$

$$\left\{ \frac{1}{2} + \frac{1}{2}\sin\frac{\pi}{2f_N}\left[\frac{f_N - |f|}{\alpha}\right] \right\}^{1/2} \text{ for } f_N(1-\alpha) \le |f| \le f_N(1+\alpha)$$

$$H(f) = 0 \text{ for } |f| > f_N(1+\alpha)$$

with $f_N = \dfrac{B\_clock\_48}{2}$

Figure 12:
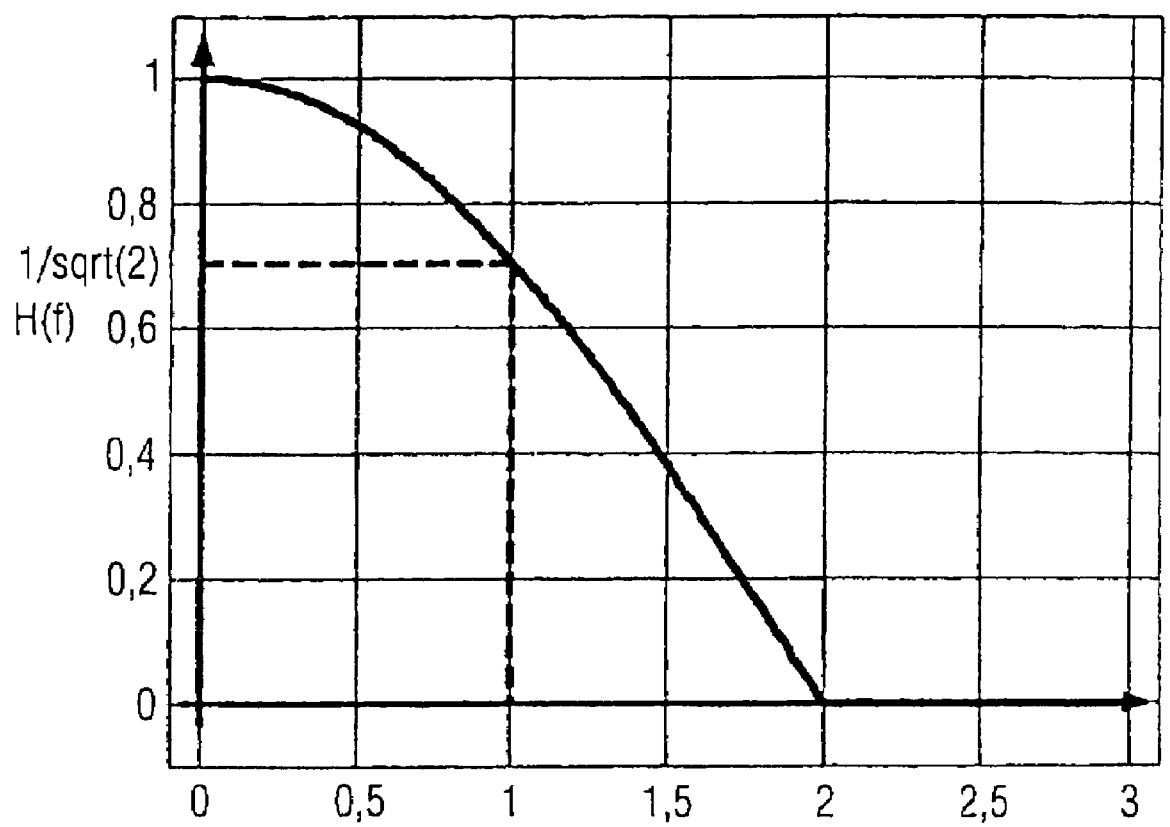
FIG. 12 is a transfer function of a filter.

FIG. 12 shows the transfer function of the filter.

The complex signal that has resulted and exists at a minimum sampling rate of 2*B_clock_48 now is to be distributed, for example, to 9 different frequency bands. This distribution may be performed by the above-described up-converter.

Figures 13A, 13B:
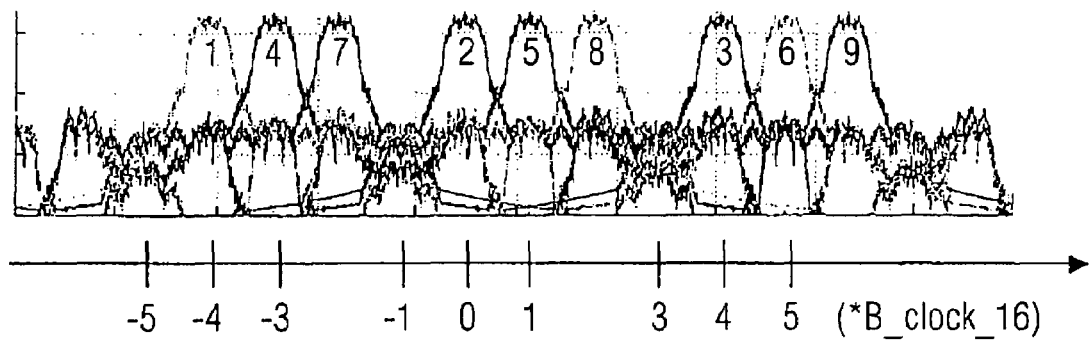
FIG. 13a shows a distribution of the complex signal to 9 different frequency bands.
FIG. 13b is a frequency table.

FIG. 13a illustrates the distribution of the complex signal to 9 different frequency bands. The following carrier frequencies are selected and numbered in accordance with the table represented in FIG. 13b. The information is relative to the carrier frequency of the T bursts, which is, e.g., 2445 MHz.

The T bursts are programmable in the transmitter. After having been radiated off, the T bursts exhibits the following properties, for example: their bandwidth does not exceed the value t_burstbw, their time duration has approximately the adjustable value t_burstlen B_cycles (plus additional temporal expansion in the transition from B_samples programmed-in to the physical signal, e.g. interpolation, dispersive analog circuits etc.), the maximum time duration is t_burstmaxlen B_cycles (plus the above-mentioned expansions), which is predefined by the transmitter implementation, their SNIR after the transmitter output has the value of transmitter SNIR or better.

In accordance with the invention, two types of T bursts may be differentiated in the following: the individual T bursts as are present after their generation and before programming, i.e. without zero padding, and the T bursts programmed in (into the transmitter), wherein, as the case may be, length adjustment by means of zero padding is still to be performed.

In the transmitter, two T bursts may be programmed in which are radiated off in accordance with a programmable selection scheme. These two T bursts are referred to as T burst 0 and T burst 1, respectively. Each of the two T bursts exists in complex-valued B_samples, i.e. the T-burst signal to be radiated off is sampled in the I und Q components at the sample frequency B_clock, respectively.

The T bursts are generated such that they are optimally controlled in the 6-quantization used. That is, that the signal actually assumes the maximally depictable value of +31.

The lengths of the first T bursts 0 and 1 programmed in in the transmitter are jointly adjustable, i.e. they are always the same, and they amount to t_sendburstlen (in B_samples). Before being programmed into the transmitter, the two T bursts may exhibit slightly different lengths t_burstlen (for T bursts 0 and 1, respectively), which differ only by few B_samples. Different lengths of bursts are adjusted by means of zero padding (see below). The maximum length of the T bursts is t_burstmaxlen (in B_samples).

The granularity in which the length of the T bursts programmed in may vary is (for implementation reasons) 8 B_samples, respectively, i.e. for the transmitter, the burst lengths are to be filled up with zeros (zero padding) up to a multiple of 8. The shorter one of the two T bursts is to be filled up with more zeros than the longer one, wherein a maximum of 7 zeros need to be filled up. If tX_burstlen is the length of the original T burst X (without zero padding), the following applies:

t_sendburstlen=ceil(max(t0_burstlen, t1_burstlen)/8)*8.

For the center of the original T burst X (without additional zeros) to be situated almost in the center of the programmed-in zero-padded burst tX_sendburst (this is required for keying in the channel bit to be transmitted), tX_startpadlen=ceil((t_sendburstlen−tX_burstlen)/2)

zeros are filled up at the beginning of the T burst, and the remainder, i.e.

floor((t_sendburstlen−tX_burstlen)/2)

zeros, are filled up at its end. Thus, the same number of zeros have been filled up at the end of the burst as at its beginning, and/or maximally one additional zero has been filled up at its end compared to at its beginning.

The acquisition bursts and tracking bursts may be transmitted, for example, in the time division multiplex.

In the multiplex of A and T bursts, precisely one A burst and, subsequently, at_multipl_len T bursts are sent within one acquisition period, the value at_multipl len being adjustable. This scheme is continued periodically.

Adjustable distances are to be maintained between the A burst and the first T burst within a period, between the individual T bursts, and between the last T burst of a period and the A burst of the next period.

A counter at_multipl_cntr, which is always reset to 0 before the beginning of the A burst and is increased by 1 after each T burst that has been completely radiated off, exists in the transmitter. The maximum value of at_multipl_cntr is thus at_multipl_len.

For the time division multiplex, the A burst present in B_samples will be considered.

When, in the following, reference is made to the "relevant A burst" (always in B_samples), what is meant is only that below-described part of the "A burst generated" (always in B_samples) which has been generated from an A burst, present in B_samples_48 by means of transmit pulse shaping, upsampling and up-conversion (either by means of Matlab or directly in the transmitter itself) as is present at the multiplexer input.

Figure 14:
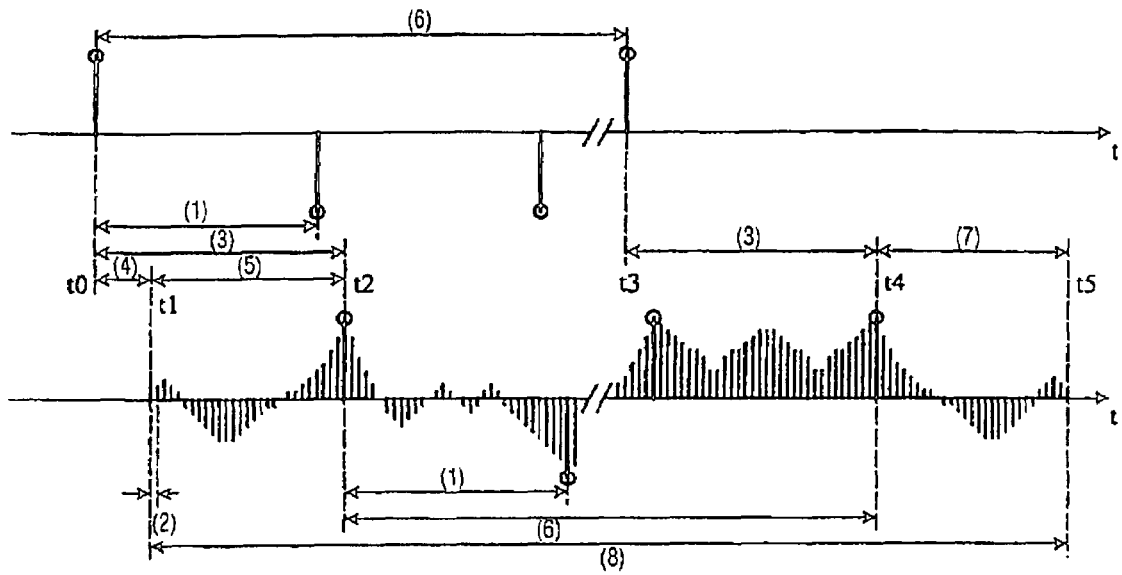
FIG. 14 shows an A burst.

FIG. 14 illustrates which part of the A burst generated is meant by "relevant A burst". The top half of the image depicts the "underlying A burst" in B_samples_48 (the distance (1) between two samples thus is B_cycle_48). Its entire length (6) is a_burstlen (in B_cycles_48).

Delays and time durations of the A burst stored in B_samples_48, of the A burst generated in B_samples (by means of transmit pulse shaping, oversampling and up-conversion), as well as the relevant A bursts are illustrated.

The bottom half shows the A burst generated in B_samples (the distance (2) between two samples thus is B_cycle).

At a time t0, the first B_sample 48 of the stored A burst is input into signal generation (transmit pulse shaping, upsampling and up-conversion). Depending on the implementation, this first B_sample_48 of the stored A burst does not appear in the generated A burst until a time t2, i.e. after a delay (3). This delay consists of two shares: By means of buffering in the signal generation for pipelining etc., an initial delay (4) results from the time t0, when the first B_sample 48 of the stored A burst is passed into the signal generation, up to a time t7, when the first valid B_sample of the generated A burst is output by this signal generation. In addition, all used filters (transmit pulse shapers and upsampling low passes) have group runtimes which cumulate to form a filter runtime (5). If the generated T burst is generated off-line with Matlab, the delay (4)=0, unless the transmitter introduces additional pipelining. The delays due to the settling of the filters, i.e. their group runtimes, however, are always existent and are to be taken into account.

If the last B_sample 48 of the stored A burst is input into the signal generation at a time t3, it also will not appear at the output of the signal generation as a B_sample before a time t4 after the delay (3). The last valid B_sample of the generated A burst is output by the signal generation at a time t5. After the time duration (7), i.e. t5-t4, all filters have decayed. With the commonly used filters with symmetrical pulse response, the time duration (7) is equal to the cumulated group runtimes (5).

The cumulated pulse widenings by means of dispersive filters (i.e. sum of settling and decaying times, (5)+(7)) must not exceed the value a_maximpwiden B_samples for a proper functioning of the overall system, in particular of the receiver, to be ensured.

The overall length (expressed in valid B_samples) of the generated A burst is thus (8), i.e. the sum of (5), (6) and (7). Since (5) and (7) are dependent on the implementation, (6) (i.e. a_burstlen, expressed in B_samples_48) will always be considered as the length of the relevant A burst. Other representation: in the unit B_sample, a_burstlen_B is the distance between the first and the last B_samples, which belong to the first and last B_samples_48, respectively, of the stored A burst.

The length, contemplated below, of the relevant A burst thus also contains no signal widenings whatsoever by means of the dispersive filter pulse responses in the signal generation (transmit pulse shaper and upsampling low passes) and no potential further implementation-induced signal widenings.

The scheme drawn at the bottom of FIG. 14 visualizes the multiplex, the burst durations and the distances. The scheme depicted reflects the burst multiplex at precisely the following specified location in the transmitter: all time ratios indicated at the bottom apply in the multiplexer, which switches between the A burst and the T burst in the transmitter. At this location, the A and T bursts thus both are present in B_samples.

What may also be referred to by the term T burst are, for example, two programmed-in T bursts which are to be selected, as has been described above.

Figure 15:
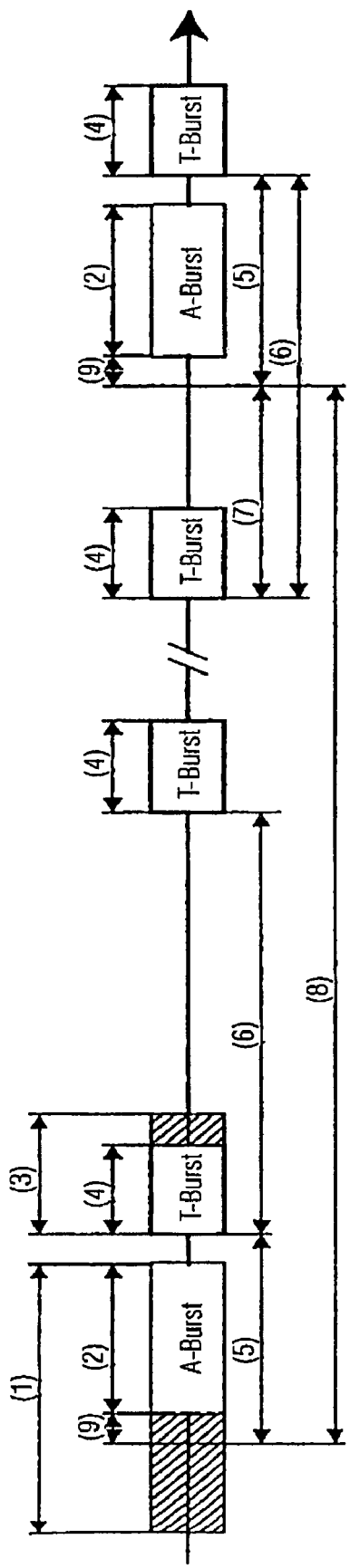
FIG. 15 shows distances in the burst multiplex.

FIG. 15 illustrates the time durations and distances in the burst multiplex.

The relevant A burst exhibits the length a_burstlen (2) (in B_cycles_48) (see above explanation regarding the rel. A burst and its length), which must be shorter than the maximum length a_burstmaxlen (1) (in B_cycles_48) of the rel. A burst.

The T burst exhibits the length t_burstlen (4)) (in B_cycles), which must be shorter than the maximum T burst length t_burstmaxlen (3) (in B_cycles).

The pause between the backend of the rel. A burst and the beginning of the T burst should keep a fixed value, even if (A and/or T) bursts of different lengths are used in the system. If the rel. A burst is made shorter or longer, only its beginning (front stop) should be shifted accordingly. If the T burst is made shorter or longer, only its backstop should be shifted accordingly.

The distance from the beginning of the rel. A burst to the beginning of the subsequent T burst is adjustable by means of two parameters. The distance at_dist (5) from the triggering for the generation of the A burst to the beginning of the subsequent T burst is adjustable in the unit S-cycles. In addition, the initial delay a_initdel (9) from the triggering to the beginning of the rel. A burst (in accordance with the above definition) is adjustable in the unit B-cycles. The actual distance from the beginning of the rel. A burst to the beginning of the T burst is thus at_dist [S_cycles]−a_initdel [B-cycles].

For implementation reasons, the distance at_dist is in the unit S_cycles.

The distance t_burstperiod (6) between the beginnings of two subsequent T bursts of an acquisition period is also adjustable in the unit S_cycles for implementation reasons.

The distance ta_dist (7) between the beginning of the last T burst of an acquisition period and the triggering before the generation of the A burst of the next acquisition period is also adjustable in the unit S-cycles.

In the transmitter, the actual distances may vary slightly around their nominal value for implementation reasons.

The three burst distances are not freely adjustable but must meet the following requirement:

$$ta\_dist + at\_dist = t\_burstperiod.$$

The distance a_burstperiod (8) between the beginnings of the A bursts of two successive acquisition periods is not adjustable in the transmitter, but results from the other adjustable parameters:

$$a\_burstperiod[S\_cycles] = at\_multipl\_len * t\_burstperiod[S\_cycles]$$

The T-burst periods may be indicated, for example, in a multiple of 100 B_samples/reference frequency. To avoid unfavorable recurring overlap situations, these multiples may further be prim toward one another. For example, the following periods (in B_samples) are suitable if a burst period should be around 500 microseconds: 100 B_samples×463 467 479 487 491 499 503 509 521 523 (a first prime number would be 541 only). The minimum period thus is 454,5 microseconds (i.e. 2200/s), the maximum period is 513,4 microseconds (i.e. 1948/s).

The orthogonal transmit bursts may further be designed in accordance with a pseudo random principle, it being possible for the pseudo random principle to be based on a prime-number algorithm. In accordance with the invention, the transmitter may be allocated fixed burst repetition rates which, however, are slightly different from transmitter to transmitter (non-synchronized pseudo random patterns). Thus, this is a method in accordance with which the burst distances of a transmitter are selected at random to avoid a fixed pattern of burst overlaps. For example, one transmitter sends 2000 bursts per second, a further transmitter sends 2001 bursts per second.

From the two T bursts stored in the transmitter, one is always selected for radiation. The selection is conducted by means of a bit t_choice, which is obtained by means of a programmable mask t_choice_mask from the counter at_multipl_cntr in accordance with the following specification:

T_choice=(t_choice_mask[0] AND at_multipl_cntr [0]) OR (t_choice_mask[1] AND at_multipl_cntr[1])

Here, variable [0] represents bit No. 0 (i.e. the LSB) of a variable, and variable [1] represents bit No. 1, and furthermore, AND and/or OR represents the bitwise AND and/or OR.

If t_choice exhibits the value 0, T burst 0 is radiated, when t_choice==1, T burst 1 is radiated.

For t_choice_mask==00(LSB on the right-hand side), T burst 0 thus is always radiated, for t_choice_mask==01, T burst 0 and T burst 1 take turns after each T burst (beginning with T burst 0 after the A burst)

for t_choice_mask==10, T burst 0 and T burst 1 take turns after every other T burst (beginning with T burst 0 after the A burst), i.e. what is radiated is: T burst 0, T burst 0, T burst 1, T burst 1, T burst 0, T burst 0, T burst 1, ...

t_choice_mask==11 is not a useful choice and must not be set.

Two transmit antennas may exist in the transmitter. It is possible to use both at the same time or to select only one of them. If both are to be used, a programmable bit two_ants is set to a value of 1. If two_ants==0, only one of the two transmit antennas is selected for radiation in each case. The selection is conducted by means of a bit ant_choice, which is obtained by means of a programmable mask ant_choice_mask from the counter at_multipl_cntr in accordance with the following specification:

ant_choice=(ant_choice_mask[0] AND at_multipl_cntr[O]) OR (ant_choice_mask[1] AND at_multipl_cntr[1]).

Variable[0] represents bit No. 0 (i.e., the LSB) of a variable, and variable[1] represents bit No. 1, and moreover, AND and/or OR represent the bitwise AND and/or OR.

If ant_choice has a value of 0, antenna 0 is used for radiation, with ant_choice==1, antenna 1 is used for radiation.

However, this only applies to two_ants==0. With two_ants==1, each burst is radiated off on two antennas. For two_ants==0, the following scheme results:

For ant_choice_mask==00 (LSB to the right-hand side), antenna 0 is always used for radiation, for ant_choice_mask==01, antenna 0 and antenna 1 take turns after each T burst (beginning with antenna 0 for the A burst and the subsequent T burst)

for ant_choice_mask==10, antenna 0 and antenna 1 take turns after every other T burst (beginning with antenna 0 for the A burst and the subsequent T burst), i.e. radiation is performed, one after the other, on: antenna 0, antenna 0, antenna 1, antenna 1, antenna 0, antenna 0, antenna 1, ...

ant_choice_mask==11 is not a useful choice and must not be set.

As has already been mentioned, the T bursts may also be used for enabling a transmission of data (of further information) which are keyed into the T bursts in a bitwise manner.

The keyed-in data transmission operates in a frame-based manner. A frame is a selection of useful data jointly transmitted within a time interval. For this transmission, frame_len T bursts are required, the value frame_len being adjustable. Subsequently, the next frame is transmitted in the following time interval. The selection of useful data to be transmitted remains the same from frame to frame, only its content may change. Each frame is self-contained and may be received and evaluated, i.e. synchronized and decoded, individually.

In the transmitter there exists a bit oddframeflag, which is always toggled immediately prior to the generation of the next frame (from 0 to 1 or from 1 to 0) i.e. with even frame numbers, it has the value of 0, and with odd frame numbers, it has the value of 1.

The compilation of the data corresponds to reading out the registers selected for transmission, this selection being programmable. This compilation, i.e. the reading-out of the selected registers, must be completed within as short a period as possible. Subsequently, the data of the selected registers exist as a single long bit vector databitvec. The entire data volume, i.e. the length of databitvec (in bits), is referred to as nodatabits.

Figure 16:
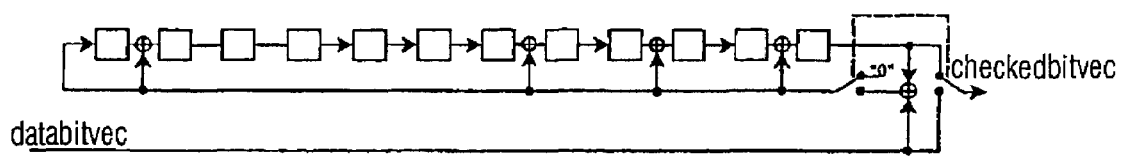
FIG. 16 is a block diagram of a systematic encoder for CRC-12 code.

In order to add cyclic redundancy check bits, the present invention further provides a systematic encoder. FIG. 16 shows a block diagram of a systematic encoder for CRC-12 code.

For a receiver to be able to perform an integrity check of the data received and to detect any residual errors after the channel decoding, the 12 parity bits of a CRC-12 code is calculated, for the data in databitvec, and attached behind the ends of databitvec. The bit vector thus generated is referred to as checkedbitvec. For such a CRC-12 code being allowed to be used, nodatabits must be ←2035.

The CRC-12 code is characterized by its generator polynomial $g(X)=X^{12}+X^{11}+X^3+X^2+X+1$.

The encoder contains 12 interconnected registers for 1 bit, respectively. All additions are to be conducted in a binary manner, i.e. 1+1=0 (EXOR). In addition, two mutually coupled switches are contained. At the start, both switches are in the lower position. Prior to the start, all 12 bit registers are initialized to a value of 0. Then the bits contained in databitvec are applied, one after the other, to the input, i.e. one bit per clock. At the output, the bits generated are read out from checkedbitvec at the same time. At first, databitvec[0] is applied at the input (indexing begins with 0). checkedbitvec[0] is read out at the output. After nodatabits−1 clocks, the last input bit databitvec[nodatabits−1] is applied at the input, and checkedbitvec[nodatabits−1] is read out at the output. For the next clock, both switches are switched to the upper position. From now on, the line below the registers constantly has a bit value of 0. The output is still being read out for 12 clocks, including this clock, and yields checkedbitvec[nodatabits] to checkedbitvec[nodatabits+11]. Then, the CRC generation is completed.

All in all, the generated bit vector checkedbitvec has the length nocheckedbits=nodatabits+12, the first nodatabits bits being identical to the vector databitvec.

Figure 17:
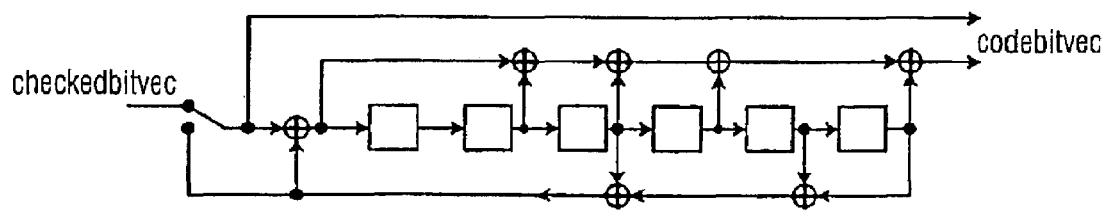
FIG. 17 is a block diagram of a temporally limited recursive systematic convolutional encoder.

In accordance with the invention, a channel coding (forward error correcting code) is also performed as a measure of protection from transmission errors. FIG. 17 shows a block diagram of a temporally limited recursive systematic convolutional encoder of the rate of 1/2.

As a measure of protection from transmission errors, a channel coding of the vector checkedbitvec is conducted, use being made of a forward error correction code. Specifically, this is a temporally limited recursive systematic convolutional code of the rate of 1/2, which has been derived from the industrial-standard convolutional code [RD2] and is characterized by its generator polynomials $(1, (x^6+x^3+x^2+x+1)/(x^6+x^5+x^3+x^2+1))$. By coding the vector checkedbitvec, a vector codebitvec consisting of code bits results.

The encoder contains 6 interconnected registers for 1 bit, respectively. All additions are to be conducted in a binary manner, i.e. 1+1=0 (EXOR). At the start, the switch contained is in the upper position. Prior to the start, all 6 bit registers are initialized to a value of 0. Subsequently, the bits contained in checkedbitvec are applied, one after the other, to the input, to be precise in a manner such that every 2 clocks, a different bit is applied. The contents of the 6 registers also may change every 2 clocks only, in each case when a different bit is applied to the input. The two outputs are read out in parallel one after the other, the upper output being read first, and the lower output being read out in the next clock. Initially, checkedbitvec[0] is applied at the input (indexing begins with 0), and initially, codebitvec[0] (at the upper output), and in the next clock, codebitvec[1] (at the lower output) are read out. After a total of two clocks, checkedbitvec[1] is applied at the input, and in successive clocks, codebitvec[2] and codebitvec[3] are read out at the output. After a total of 2*(nocheckedbit−1) clocks, checkedbitvec[nocheckedbit−1] is applied at the input, and codebitvec[2*nocheckedbits−2] and then codebitvec[2*nocheckedbits−1] are read out at the output. After a total of 2*nocheckedbits clocks, the switch is switched into the lower position. In addition, the register contents may change only every 2 clocks. Including this clock, the outputs are alternatingly read out for a total of 12 clocks, and yields codebitvec[2*nocheckedbits] to codebitvec[2*nocheckedbits+11]. Then the channel encoding is completed. By means of the depicted implementation of the encoder, all registers again contain the bit value of 0 at the end.

The bit vector codebitvec which has been generated has a total length of nocodebits=2*nocheckedbits+12, the bits with the index 0, 2, 4, . . . , 2*(nocheckedbits−1) being identical with the vector checkedbitvec.

As a measure of protection from deleting several successive code bits, the order of the code bits contained in the codebitvec is changed in the channel interleaver. Here, the bit vector ilvedbitvec to be output is generated. The interleaver used is a modulus interleaver. It performs the following changes to the order of bits:

ilvedbitvec[i]=codebitvec[(i*ilvshift) mod nocodebits] für i=0, . . . ,nocodebits−1 ilvshift being an adjustable value, and the indexing of the bit vectors beginning with 0.

At the end, ilvedbitvec has the length of nocodebits (in bits).

A preamble for the frame synchronization is placed before the start of ilvedbitvec:

if oddframeflag=0, the Barker sequence 11100010010 is used as a preamble if oddframeflag=1, the inverted Barker sequence 00011101101 is used as a preamble The leading preamble with the subsequent ilvedbitvec yields a vector of channel bits, which is referred to as channelbitvec. Its length is frame_len=nocodebits+11.

All frame_len bits of the vector channelbitvec are transmitted individually, respectively, in a T burst, i.e. frame_len T bursts are required for transmitting the entire vector channelbitvec. Mapping and transmit pulse shaping of each channel bit is conducted in one single step, i.e. in a step of "keying in" into a T burst by means of a differential binary phase shift keying direct sequence spread spectrum (DBPSK-DSSS) method.

Each T burst is generated from two halfbursts halfburst1 and halfburst2, which are present in B_samples (with I and Q components, respectively).

Figure 18:
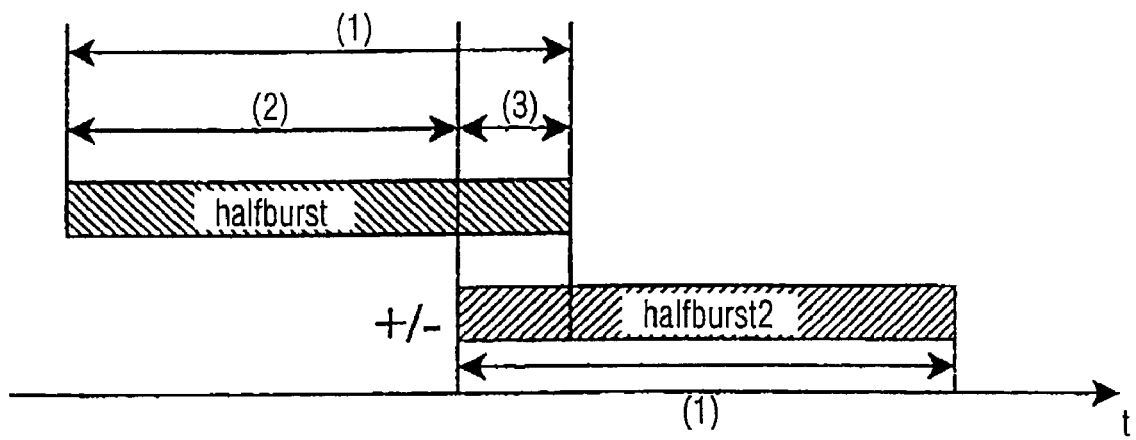
FIG. 18 shows a generation of the T burst.

FIG. 18 illustrates the generation of the T burst.

To generate the T burst, the inventive means for providing includes a means for generating a T burst with a keyed-in check channel bit.

The halfbursts halfburst1 and halfburst2 each have the length halfburstlen (1) (in B_samples). For generating the T burst, halfburst2 is temporally delayed and, weighted with +1 or −1, added to halfburst1. The temporal delay of halfburst2 with regard to halfburst1 is shift12 (in B_samples). halfburstlen and shift12 have individual values for each programmable T burst.

The transition range, where halfburst1 and halfburst2 (the latter being temporally delayed by shift12) overlap, has a length of halfburstlen−shift12 B_samples, the limitation halfburstlen−shift12<=overlapmaxlen (in B_samples) always being adhered to in the design of the halfbursts.

The weighting of the temporally delayed halfburst2 in the addition to halfburst1 is performed in accordance with the following scheme:

if the channel bit currently to be transmitted has a value of 0, +halfburst2 is added, if the channel bit currently to be transmitted has a value of 1, −halfburst2 is added.

Thus, the generation of the T burst of the length t_burstlen=halfburstlen+shift12 for the current channel bit is completed, and may be radiated off.

Depending on the circumstances, the inventive methods may be implemented in hardware or in software. The implementation may be effected on a digital storage medium, in particular a disc or CD with electronically readable control signals which may be cooperate with a programmable computer system such that the respective method is performed. Generally, the invention thus also consists in a computer program product with a program code, stored on a machine-readable carrier, for performing the inventive methods when the computer program product runs on a computer. In other words, the invention may thus be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A synchronization device for determining a position of a synchronization signal in a receive signal, the synchronization signal being based on a coarse synchronization signal and a fine synchronization signal, comprising:

a signal processor configured to determine, based on the coarse synchronization signal, a section of the receive signal in which is located the fine synchronization signal, and to determine in the section of the receive signal, based on the fine synchronization signal, the position of the synchronization signal in the receive signal for a synchronization, wherein the signal processor is configured to detect the fine synchronization signal in the section of the receive signal, and wherein the coarse synchronization signal comprises a bandwidth which is smaller than a bandwidth of the fine synchronization signal, the signal processor being configured to perform a detection of the coarse synchronization signal in the receive signal at a first sampling rate, and to perform a detection of the fine synchronization signal at a second sampling rate, the second sampling rate being higher than the first sampling rate.

2. The synchronization device as claimed in claim 1, wherein the signal processor is configured to detect the coarse synchronization signal in the receive signal so as to determine the section of the receive signal.

3. The synchronization device as claimed in claim 1, wherein the synchronization signal includes the coarse synchronization signal and the fine synchronization signal, the signal processor being configured to detect the coarse synchronization signal for determining a start of that section of the receive signal in which is located the fine synchronization signal.

4. The synchronization device as claimed in claim 1, wherein the signal processor is configured to perform a correlation between the receive signal and a signal correlated with the coarse synchronization signal, to detect the coarse synchronization signal in the receive signal, and to perform a correlation between the section of the receive signal and a signal correlated with the fine synchronization signal, to detect a position of the fine synchronization signal in the section of the receive signal.

5. The synchronization device as claimed in claim 1, wherein the signal processor includes a course synchronization signal detector and a position detector, the course synchronization signal detector being configured to detect the coarse synchronization signal in the receive signal, to detect the section of the receive signal, and the position detector being configured to detect a position of the fine synchronization signal in the section of the receive signal.

6. The synchronization device as claimed in claim 5, wherein the course synchronization signal detector is configured to detect the coarse synchronization signal at a first sampling rate, and wherein the position detector is configured to detect the position of the fine synchronization signal at a second sampling rate, the first sampling rate being lower than the second sampling rate.

7. The synchronization device as claimed in claim 5, wherein the coarse synchronization signal occupies a predetermined frequency range, and wherein the course synchronization signal detector includes a filter for filtering the receive signal so as to filter out a receive-signal component which occupies the predetermined frequency range.

8. The synchronization device as claimed in claim 7, wherein the filter is a band-pass filter.

9. The synchronization device as claimed in claim 7, wherein the course synchronization signal detector comprises a downconverter for down-converting the receive-signal component.

10. The synchronization device as claimed in claim 7, wherein the course synchronization signal detector includes a detector, the detector being configured to detect the coarse synchronization signal in the receive-signal component.

11. The synchronization device as claimed in claim 10, wherein the detector is configured to perform a correlation between the receive-signal component and a signal correlated with the coarse synchronization signal.

12. The synchronization device as claimed in claim 11, wherein the detector is configured to output a detection signal which indicates a detection of the coarse synchronization signal when a value of the correlation exceeds a detection threshold.

13. The synchronization device as claimed in claim 5, wherein the course synchronization signal detector is configured to provide a detection signal which indicates a time of detection of the coarse synchronization signal, the time of detection indicating a start of that section of the receive signal in which is located the fine synchronization signal, and wherein the position detector is configured to receive the detection signal and to detect, in response to the detection signal, a position of the line synchronization signal in the section of the receive signal.

14. The synchronization device as claimed in claim 5, wherein the position detector includes a delayer for delaying the receive signal, the delayer being configured to compensate for a detection delay of the course synchronization signal detector.

15. The synchronization device as claimed in claim 5, wherein the fine synchronization signal comprises a predetermined bandwidth, the position detector comprising a filter to limit the receive signal to the predetermined bandwidth.

16. The synchronization device as claimed in claim 5, wherein the position detector includes a detector for detecting a position of the fine synchronization signal in the section of the receive signal.

17. The synchronization device as claimed in claim 16, wherein the detector is configured to determine a correlation between the section of the receive signal and a signal correlated with the fine synchronization signal so as to detect the position of the fine synchronization signal.

18. The synchronization device as claimed in claim 17, wherein the detector is configured to determine a first partial correlation between a first subset of receive-signal values in the section of the receive signal and a first subset of values of the signal correlated with the fine synchronization signal, and to determine a second partial correlation between a second subset of receive-signal values in the section of the receive signal and a second subset of values of the signal correlated with the fine synchronization signal, and to determine the correlation by means of an overlap of the first partial correlation and the second partial correlation.

19. The synchronization device as claimed in claim 18, wherein the detector is configured to detect a phase in relation between corresponding values of the first partial correlation and the second partial correlation, the phase relation including a frequency offset between the transmitter and the receiver, and to eliminate the phase relation by weighting the values of the first partial correlation or the values of the second partial correlation, so as to reduce an influence of the frequency offset on values of the correlation.

20. The synchronization device as claimed in claim 17, wherein the detector includes an interpolator for interpolating between the values of the correlation to obtain a fine correlation and to detect the position of the fine synchronization signal, with higher accuracy, on the basis of the fine correlation.

21. The synchronization device as claimed in claim 5, wherein the fine synchronization signal includes information, the information being coded by a phase relation between successive values of the fine synchronization signal, and the position detector being configured to detect the information by detecting the phase relation.

22. The synchronization device as claimed in claim 17, wherein the position detector is configured to derive quality values for a receive quality from the correlation.

23. The synchronization device as claimed in claim 1, wherein the position detector is configured to output a position signal which indicates a position of the fine synchronization signal in the section of the receive signal, so as to indicate a position of the synchronization signal in the receive signal.

24. A device for synchronizing a receiver and a transmitter, the transmitter being configured to send out a synchronization signal which is based on a coarse synchronization signal for a coarse synchronization, and on a fine synchronization signal for a fine synchronization, comprising:

a sampler for sampling a receive version of the synchronization signal to provide a receive signal;

a synchronization device for determining a position of a synchronization signal in a receive signal, the synchronization signal being based on a coarse synchronization signal and a fine synchronization signal, comprising:
a signal processor configured to determine, based on the coarse synchronization signal, a section of the receive signal in which is located the fine synchronization signal, and to determine in the section of the receive signal, based on the fine synchronization signal, the position of the synchronization signal in the receive signal for a synchronization,
wherein the signal processor is configured to detect the fine synchronization signal in the section of the receive signal, and
wherein the coarse synchronization signal comprises a bandwidth which is smaller than a bandwidth of the fine synchronization signal, the signal processor being configured to perform a detection of the coarse synchronization signal in the receive signal at a first sampling rate, and to perform a detection of the fine synchronization signal at a second sampling rate, the second sampling rate being higher than the first sampling rate,
the synchronization device being configured to provide a position signal which indicates a position of the synchronization signal in the receive signal; and
a controller for controlling a sampling time of the sampler in dependence on the position signal so as to synchronize the receiver and the transmitter.

25. A device for generating and emitting a synchronization signal to synchronize a receiver and a transmitter, comprising:
a coarse synchronization signal provider for providing a coarse synchronization signal having a first bandwidth, and a fine synchronization signal having a second bandwidth, the first bandwidth being smaller than the second bandwidth; and
a synchronization signal provider for providing the synchronization signal using the coarse synchronization signal and the fine synchronization signal;
wherein the synchronization signal includes the coarse synchronization signal and the fine synchronization signal, the provider being configured to provide the fine synchronization signal temporally after the coarse synchronization signal.

26. The device as claimed in claim 25, wherein the provider is configured to provide a further fine synchronization signal differing from the fine synchronization signal, the provider being configured to treat the further fine synchronization signal like the fine synchronization signal.

27. The device as claimed in claim 25, wherein the provider is configured to encode information by means of a phase change between successive values of the fine synchronization signal in the fine synchronization signal.

28. The device as claimed in claim 27, wherein the provider is configured to encode the information by means of a phase jump by 180° between a number of values of the fine synchronization signal and a further number of values of the fine synchronization signal.

29. A device for generating and emitting a synchronization signal to synchronize a receiver and a transmitter, comprising:
a coarse synchronization signal provider for providing a coarse synchronization signal having a first bandwidth, and a fine synchronization signal having a second bandwidth, the first bandwidth being smaller than the second bandwidth; and
a synchronization signal provider for providing the synchronization signal using the coarse synchronization signal and the fine synchronization signal;
wherein the provider is configured to provide the fine synchronization signal temporally after the coarse synchronization signal such that there is a predetermined time interval between a provision of the coarse synchronization signal and a provision of the fine synchronization signal.

30. A device for generating and emitting a synchronization signal to synchronize a receiver and a transmitter, comprising:
a coarse synchronization signal provider for providing a coarse synchronization signal having a first bandwidth, and a fine synchronization signal having a second bandwidth, the first bandwidth being smaller than the second bandwidth; and
a synchronization signal provider for providing the synchronization signal using the coarse synchronization signal and the fine synchronization signal;
wherein the provider is configured to provide a plurality of fine synchronization signals temporally after the coarse synchronization signal.

31. The device as claimed in claim 30, wherein the provider is configured to provide the plurality of fine synchronization signals by temporally joining copies of the fine synchronization signal.

32. The device as claimed in claim 31, wherein the provider is configured to introduce a predetermined time interval between successive copies of the fine synchronization signal.

33. A device for generating and emitting a synchronization signal to synchronize a receiver and a transmitter, comprising:
a coarse synchronization signal provider for providing a coarse synchronization signal having a first bandwidth, and a fine synchronization signal having a second bandwidth, the first bandwidth being smaller than the second bandwidth; and
a synchronization signal provider for providing the synchronization signal using the coarse synchronization signal and the fine synchronization signal;
wherein the provider includes a pulse shaping filter for filtering the coarse synchronization signal or the fine synchronization signal.

34. The device as claimed in claim 33, wherein the pulse shaping filter is a cosine roll-off filter having a roll-off factor of 1.

35. A device for generating and emitting a synchronization signal to synchronize a receiver and a transmitter, comprising:
a coarse synchronization signal provider for providing a coarse synchronization signal having a first bandwidth, and a fine synchronization signal having a second bandwidth, the first bandwidth being smaller than the second bandwidth; and
a synchronization signal provider for providing the synchronization signal using the coarse synchronization signal and the fine synchronization signal;
wherein the provider is configured to generate the coarse synchronization signal from a data sequence and to generate the fine synchronization signal from a further data sequence, a bandwidth of the data sequence being smaller than a bandwidth of the further data sequence.

36. The device as claimed in claim 35, wherein the provider includes a generator for generating a data sequence for generating the further data sequence.

37. The device as claimed in claim 36, wherein the generator is configured to generate the data sequence from a Galois field having four elements, and to generate the further data sequence from a Galois field.

38. The device as claimed in claim 36, wherein the generator includes a shift register for generating the data sequence, or for generating the further data sequence, the generator being configured to set an initial occupation of the shift register.

39. The device as claimed in claim 35, wherein the provider includes an associator for associating a complex-valued number with each element of the data sequence so as to obtain a complex-valued sequence, or for associating a complex-valued number with each element of the further data sequence so as to obtain a further complex-valued sequence.

40. The device as claimed in claim 39, wherein the provider includes an up-converter to generate the coarse synchronization signal by up-converting the complex-valued sequence, or to generate the fine synchronization signal by up-converting the further complex-valued sequence.

41. A synchronization method for determining a position of a synchronization signal in a receive signal, the synchronization signal being based on a coarse synchronization signal and a fine synchronization signal, the method comprising:
   determining a section of a receive signal in which is located the fine synchronization signal, by means of a signal processor, on the basis of the coarse synchronization signal;
   determining, by means of a signal processor, the position of the synchronization signal in the receive signal for a synchronization on the basis of the fine synchronization signal in the section of the receive signal,
   wherein the step of determining the position of the synchronization signal in the receive signal includes the step of detecting the fine synchronization signal in the receive signal,
   wherein the coarse synchronization signal has a bandwidth which is smaller than a bandwidth of the fine synchronization signal,
   wherein a detection of the coarse synchronization signal in the receive signal is performed at a first sampling rate,
   wherein a detection of the fine synchronization signal is performed at a second sampling rate, and
   wherein the second sampling rate is higher than the first sampling rate.

42. A method for synchronizing a receiver and a transmitter, the transmitter being configured to send out a synchronization signal which is based on a coarse synchronization signal for a coarse synchronization, and on a fine synchronization signal for a fine synchronization, the method comprising:
   sampling, by means of a sampler, a receive version of the synchronization signal so as to provide a receive signal;
   performing a synchronization method for determining a position of a synchronization signal in a receive signal, the synchronization signal being based on a coarse synchronization signal and a fine synchronization signal, the method comprising:
      determining a section of a receive signal in which is located the fine synchronization signal, by means of a signal processor, on the basis of the coarse synchronization signal;
      determining, by means of the signal processor, the position of the synchronization signal in the receive signal for a synchronization on the basis of the fine synchronization signal in the section of the receive signal,
      wherein the step of determining the position of the synchronization signal in the receive signal includes the step of detecting the fine synchronization signal in the receive signal,
      wherein the coarse synchronization signal has a bandwidth which is smaller than a bandwidth of the fine synchronization signal,
      wherein a detection of the coarse synchronization signal in the receive signal is performed at a first sampling rate,
      wherein a detection of the fine synchronization signal is performed at a second sampling rate, and
      wherein the second sampling rate is higher than the first sampling rate,
   to obtain a position signal which indicates a position of the synchronization signal in the receive signal; and
   controlling a sampling time in dependence on the position signal so as to synchronize the receiver and the transmitter by means of a controller.

43. A method for generating and emitting a synchronization signal to synchronize a receiver and a transmitter, the method comprising:
   providing, by means of a coarse synchronization signal provider, a coarse synchronization signal having a first bandwidth, and a fine synchronization signal having a second bandwidth, the first bandwidth being smaller than the second bandwidth;
   providing the synchronization signal using the coarse synchronization signal and the fine synchronization signal by means of a synchronization signal provider; and
   the synchronization signal including the coarse synchronization signal and the fine synchronization signal, the fine synchronization signal being provided temporally after the coarse synchronization signal.

44. A computer-readable medium storing computer executable instructions defining a program code for performing a method for determining a position of a synchronization signal in a receive signal, the synchronization signal being based on a coarse synchronization signal and a fine synchronization signal, the method comprising:
   determining a section of a receive signal in which is located the fine synchronization signal, by means of a signal processor, on the basis of the coarse synchronization signal;
   determining, by means of the signal processor, the position of the synchronization signal in the receive signal for a synchronization on the basis of the fine synchronization signal in the section of the receive signal,
   wherein the step of determining the position of the synchronization signal in the receive signal includes the step of detecting the fine synchronization signal in the receive signal,
   wherein the coarse synchronization signal has a bandwidth which is smaller than a bandwidth of the fine synchronization signal,
   wherein a detection of the coarse synchronization signal in the receive signal is performed at a first sampling rate,
   wherein a detection of the fine synchronization signal is performed at a second sampling rate, and
   wherein the second sampling rate is higher than the first sampling rate.

45. A computer-readable medium storing computer executable instructions defining a program code for performing a method for synchronizing a receiver and a transmitter, the transmitter being configured to send out a synchronization signal which is based on a coarse synchronization signal for a coarse synchronization, and on a fine synchronization signal for a fine synchronization, the method comprising:
   sampling, by means of a sampler a receive version of the synchronization signal so as to provide a receive signal;

performing a synchronization method for determining a position of a synchronization signal in a receive signal, the synchronization signal being based on a coarse synchronization signal and a fine synchronization signal, the method comprising:
  determining a section of a receive signal in which is located the fine synchronization signal, by means of a signal processor, on the basis of the coarse synchronization signal;
  determining, by means of the signal processor, the position of the synchronization signal in the receive signal for a synchronization on the basis of the fine synchronization signal in the section of the receive signal,
  wherein the step of determining the position of the synchronization signal in the receive signal includes the step of detecting the fine synchronization signal in the receive signal,
  wherein the coarse synchronization signal has a bandwidth which is smaller than a bandwidth of the fine synchronization signal,
  wherein a detection of the coarse synchronization signal in the receive signal is performed at a first sampling rate,
  wherein a detection of the fine synchronization signal is performed at a second sampling rate, and
  wherein the second sampling rate is higher than the first sampling rate,
  to obtain a position signal which indicates a position of the synchronization signal in the receive signal; and
  controlling a sampling time in dependence on the position signal so as to synchronize the receiver and the transmitter by means of a controller.

46. A computer-readable medium storing computer executable instructions defining a program code for performing a method for generating a synchronization signal to synchronize a receiver and a transmitter, the method comprising:
  providing, by means of a coarse synchronization signal provider, a coarse synchronization signal having a first bandwidth, and a fine synchronization signal having a second bandwidth, the first bandwidth being smaller than the second bandwidth; and
  providing the synchronization signal using the coarse synchronization signal and the fine synchronization signal by means of a synchronization signal provider,
  the synchronization signal including the coarse synchronization signal and the fine synchronization signal, the fine synchronization signal being provided temporally after the coarse synchronization signal.

* * * * *